(12) United States Patent
Terahara et al.

(10) Patent No.: US 6,493,129 B2
(45) Date of Patent: *Dec. 10, 2002

(54) TUNABLE OPTICAL FILTER

(75) Inventors: Takafumi Terahara, Kawasaki (JP); Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/799,638

(22) Filed: Mar. 7, 2001

(65) Prior Publication Data

US 2001/0010593 A1 Aug. 2, 2001

Related U.S. Application Data

(62) Division of application No. 09/126,423, filed on Jul. 30, 1998, now Pat. No. 6,339,492.

(30) Foreign Application Priority Data

Jan. 23, 1998 (JP) ............................................. 10-011795

(51) Int. Cl.⁷ .............................. G02F 1/09; G02B 27/28
(52) U.S. Cl. ...................... 359/283; 359/280; 359/494; 359/497; 359/498; 359/501
(58) Field of Search ................................. 359/280–283, 359/251, 484, 494, 497, 498, 501; 385/11

(56) References Cited

U.S. PATENT DOCUMENTS

| | | | | |
|---|---|---|---|---|
| 4,197,008 A | * | 4/1980 | Pinnow et al. ............... | 359/259 |
| 4,650,289 A | | 3/1987 | Kuwahara .................... | 359/484 |
| 4,678,287 A | | 7/1987 | Buhrer ........................ | 359/498 |
| 4,712,880 A | | 12/1987 | Shirasaki .................... | 359/484 |
| 4,909,612 A | | 3/1990 | Scerbak et al. ............. | 359/484 |
| 5,052,786 A | | 10/1991 | Schultz ........................ | 359/484 |
| H1155 H | | 3/1993 | Fratello et al. ............. | 359/484 |
| 5,345,329 A | | 9/1994 | Shirai et al. ................. | 359/282 |

(List continued on next page.)

FOREIGN PATENT DOCUMENTS

| | | |
|---|---|---|
| EP | 0 557 532 A1 | 9/1993 |
| EP | 0 800 286 A2 | 8/1997 |
| EP | 0 812 078 A2 | 10/1997 |
| EP | 0 800 286 A3 | 12/1998 |
| GB | 2 304 229 A | 12/1997 |
| GB | 2 314 714 A | 7/1998 |
| JP | 6-130339 | 5/1994 |
| JP | 7-120711 | 5/1995 |
| JP | 7-120711 | 6/1995 |
| JP | 9-159526 A | 6/1997 |

OTHER PUBLICATIONS

K. Inoue, et al., "Tunable Gain Equalization Using a Mach–Sehnder Optical Filter in Multistage Fiber Amplifiers," IEEE Photonics Technol. Letts., vol. 3, No. 8, Aug. 1991, pp. 718–720.

H. Kim, et al.. "Single–Mode–Fiber Acousto–Optic Tunable Notch Filter with Variable Spectral Profile," Korean Advanced Inst. of Sci. and Technol., pp. PD7–1 to PD7–4 (OFC '97).

Oda, K., et al., "128channel, 480km FSK–DD transmission experiment using 0.98μm pumped erbium–doped fibre amplifiers and a tunable gain, equalizer," Electronics Letters, vol. 30, No. 12, Jun. 1994, pp. 982–983.

(List continued on next page.)

*Primary Examiner*—Evelyn A Lester
(74) *Attorney, Agent, or Firm*—Staas & Halsey LLP

(57) ABSTRACT

An optical filter having a changeable optical transmittance versus wavelength characteristic curve to variably filter a light. The curve maintains a fixed optical transmittance at a specific wavelength as the curve is changed. The optical filter includes a Faraday rotator having a variable Faraday rotation angle, to change the optical transmittance versus wavelength characteristic curve.

28 Claims, 33 Drawing Sheets

U.S. PATENT DOCUMENTS

| | | | | |
|---|---|---|---|---|
| 5,446,578 | A | 8/1995 | Chang et al. | 359/282 |
| 5,694,233 | A | 12/1997 | Wu et al. | 359/251 |
| 5,724,373 | A | 3/1998 | Chang | 372/20 |
| 5,805,759 | A | 9/1998 | Fukushima | 385/140 |
| 5,812,710 | A | 9/1998 | Sugaya | 385/27 |
| 5,818,629 | A | 10/1998 | Kinoshita | 359/341 |
| 5,844,710 | A | 12/1998 | Fukushima | 359/283 |
| 5,859,725 | A | 1/1999 | Sugiya et al. | 359/341 |
| 5,867,300 | A | 2/1999 | Onaka et al. | 359/283 |
| 5,889,609 | A | 3/1999 | Fukushima | 359/280 |
| 5,889,610 | A | 3/1999 | Fatehi et al. | 359/341 |
| 5,912,750 | A | 6/1999 | Takeda et al. | 359/124 |
| 5,940,208 | A | 8/1999 | Blaszyk et al. | 359/341 |
| 5,953,467 | A | 9/1999 | Madsen | 385/15 |
| 5,963,361 | A | 10/1999 | Taylor et al. | 359/337 |
| 5,973,821 | A | 10/1999 | Onaka et al. | 359/283 |
| 5,982,539 | A | 11/1999 | Shirasaki | 359/484 |
| 6,016,219 | A | 1/2000 | Fatehi et al. | 359/341 |
| 6,151,157 | A | 11/2000 | Ball et al. | 359/341 |
| 6,339,492 | B1 * | 1/2002 | Terahara et al. | 359/283 |

OTHER PUBLICATIONS

Naito, T., et al., "85–Gb/s WDM transmission experiment over 7931 km using gain equalization to compensate for asymmetry in EDFA gain characteristics," OECC Technical Digest, Jul. 1996, PD1–2.

Oguma, T., "Optical gain equalizer for optical fiber amplifier," 2nd Transmission Divison/NEC Corporation, p. 578, B–1093 (Japanese language) No Date Available.

Wysocki, P., et al., "Erbium–Doped Fiber Amplifier Flattened Beyond 40 nm Using Long–Period Grating," Lucent Technologies, OFC '97, pp. PD2–1–PD2–4.

Pan, J–Y., et al., "Fiber–Amplifier Cascades with Equalization Employing Mach Zehnder Optical Filters in Multiwavelength Systems," The City College of City University of New York, OOA, FA3–1, pp. 114–116. No Date Available.

Sugaya, Y., et al., "Configuration Design of Multi–wavelength Er–doped Fiber Amplifier for WDM Transmission System," Technical Report of IEICE, OSC95–36 (Jul. 1995) pp. 21–26 (Japanese language reference with English language Abstract).

Bergano, N.S., et al., "Wavelength Division Multiplexing in Long–Haul Transmission Systems," Journal of Lightwave Technology, vol. 4, No. 6, Jun. 1996, pp. 1299–1308.

U.S. patent application Ser. No. 10/005,156, Takafum Terahara, filed Dec. 7, 2001 Fujitsu Limited.

* cited by examiner

RELATIVE WAVELENGTH NORMALIZED BY FSR

RELATIVE WAVELENGTH NORMALIZED BY FSR

RELATIVE WAVELENGTH NORMALIZED BY FSR

RELATIVE WAVELENGTH NORMALIZED BY FSR

TUNABLE OPTICAL FILTER

This application is a divisional of application Ser. No. 09/126,423, filed Jul. 30, 1998, now U.S. Pat. No. 6,339,492.

BACKGROUND OF THE INVENTION

1. Field of the Invention

The present invention relates generally to a tunable optical filter applicable to a system such as an optical fiber communication system, and more particularly to a tunable optical filter in which the shape of a characteristic curve giving a wavelength characteristic of transmittance changes along a transmittance axis.

2. Description of the Related Art

In recent years, a manufacturing technique and using technique for a low-loss (e.g., 0.2 dB/km) optical fiber have been established, and an optical fiber communication system using the optical fiber as a transmission line has been put to practical use. Further, to compensate for losses in the optical fiber and thereby allow long-haul transmission, the use of an optical amplifier for amplifying signal light has been proposed or put to practical use.

An optical amplifier known in the art includes an optical amplifying medium to which signal light to be amplified is supplied and means for pumping the optical amplifying medium so that the optical amplifying medium provides a gain band including the wavelength of the signal light. For example, an erbium doped fiber amplifier (EDFA) includes an erbium doped fiber (EDF) as the optical amplifying medium and a pumping light source for supplying pump light having a predetermined wavelength to the EDF. By preliminarily setting the wavelength of the pump light within a 0.98 μm band or a 1.48 μm band, a gain band including a wavelength of 1.55 μm can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by a gain characteristic (wavelength characteristic of gain) which is often called as a gain tilt. For example, in an EDFA, a gain deviation is produced at wavelengths in the vicinity of 1.55 μm. When a plurality of EDFAs are cascaded to cause accumulation of gain tilts, an optical SNR (signal-to-noise ratio) in a channel included in a band giving a small gain is degraded.

To cope with the gain tilt of an optical amplifier, a gain equalizer may be used. Before a degradation in optical SNR in a certain channel becomes excessive due to accumulation of gain tilts, gain equalization is performed by the gain equalizer provided at a suitable position.

A tunable optical filter is known as an optical device usable as the gain equalizer. In the tunable optical filter, a wavelength characteristic of transmittance (or loss) (wavelength dependence of transmittance) is variable. For example, the wavelength characteristic of the tunable optical filter is set or controlled so as to cancel the gain tilt of an optical amplifier, thereby reducing an interchannel deviation of powers of optical signals at the receiving end.

Conventionally known is a tunable optical filter having a mechanically movable part. In this kind of tunable optical filter, for example, an angle of incidence of a light beam on an optical interference film or a diffraction grating is mechanically changed, thereby changing a center wavelength in a transmission band or a center wavelength in a rejection band. That is, the shape of a characteristic curve giving a wavelength characteristic of transmittance changes along a wavelength axis. Further, a tunable optical filter provided by Photonics Technologies, Inc. applies a split-beam Fourier filter as the basic principles to make variable not only the center wavelength, but a rejection quantity (transmittance) itself by mechanical means. That is, the shape of a characteristic curve giving a wavelength characteristic of transmittance is variable not only along the wavelength axis, but along a transmittance axis.

Further, as a tunable optical filter capable of changing a wavelength characteristic of loss by electrical means without using any mechanically movable part, a waveguide type Mach-Zehnder (MZ) optical filter and an acousto-optic tunable filter (AOTF) are known, for example.

Further, an optical bandpass filter capable of varying a center wavelength applying a birefringent filter as the basic principles has been proposed.(Japanese Patent Laid-open Publication No. 6-130339).

The tunable optical filter having a mechanically movable part has defects such that high-speed operation is difficult and reliability is lacking. Further, the MZ optical filter and the AOTF at present have defects such that (1) a drive voltage is high, (2) a power consumption is large, (3) a temperature stabilizing device is required to cause an unavoidable enlargement of scale, and (4) reliability cannot be obtained.

It is therefore desired to design a tunable optical filter that can satisfy such conditions that (1) no mechanically movable part is included to obtain high reliability, (2) the filter is controllable by electrical means, and (3) a drive voltage is low and a power consumption is small.

As a candidate for the tunable optical filter satisfying these conditions, a tunable optical filter described in Japanese Patent Laid-open Publication No. 6-130339 is noticeable. This tunable optical filter has a variable Faraday rotator for giving a variable Faraday rotation angle, in which the shape of a characteristic curve giving a wavelength characteristic of transmittance is changed along the wavelength axis according to a change in the Faraday rotation angle. However, the shape of the characteristic curve cannot be changed along the transmittance axis. In the prior applications of the gain equalizer,for example, it is required that a loss depth in a rejection band is variable, it therefore cannot be said that this tunable optical filter always have a sufficient performance as a gain equalizer.

SUMMARY OF THE INVENTION

It is therefore an object of the present invention to provide a tunable optical filter in which the shape of a characteristic curve giving a wavelength characteristic of transmittance changes along the transmittance axis. The other objects of the present invention will become apparent from the following description.

In accordance with an aspect of the present invention, there is provided a tunable optical filter comprising first and second polarizers, a birefringent element, and a Faraday rotator. Each of the first and second polarizers has a transmission axis determining a polarization axis of transmitted polarized light. The birefringent element is provided between the first and second polarizers to give a phase difference between two orthogonal components of transmitted polarized light. The phase difference is determined by an optic axis of the birefringent element. The Faraday rotator is provided between the first and second polarizers to give a variable Faraday rotation angle to transmitted polarized light. The order of arrangement of the birefringent element and the Faraday rotator and the relative positional relation between the optic axis of the birefringent element and the transmission axis of each of the first and second polarizers are, for example, set so that the shape of a characteristic curve giving a wavelength characteristic of transmittance changes along a transmittance axis according to a change in the Faraday rotation angle.

With this configuration, the order of arrangement and the relative positional relation are set in a specific manner, so that the shape of the characteristic curve is variable along the transmittance axis, thus, a loss depth in a rejection band can be changed, thereby achieving one of the objects of the present invention.

In the present specification, the term of "transmittance" is defined as a power transmittance.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Some preferred embodiments of the present invention will now be described in detail with reference to the attached drawings.

Figure 1:
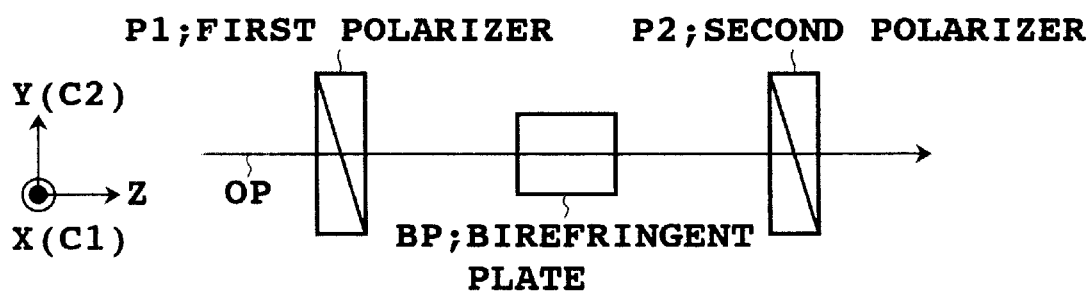
FIG. 1 is a view for illustrating a birefringent filter in the prior art.

A birefringent filter will first be described with reference to FIG. 1 because it is considered useful in understanding the configuration and operation of the tunable optical filter according to the present invention. The birefringent filter shown in FIG. 1 is configured by arranging a first polarizer P1, a birefringent plate BP, and a second polarizer P2 in this order on an optical th OP. An orthogonal three-dimensional coordinate system (X, Y, Z) having a Z axis parallel to the optical path OP is adopted herein. It is assumed that the X axis and the Y axis are parallel to the optic axes (C1 axis and C2 axis) of the birefringent plate BP respectively, and the angle formed between the transmission axis of the first polarizer P1 and the Y axis is 45°. The angle formed between the transmission axis of the second polarizer P2 and the Y axis is arbitrary. "The transmission axis of a polarizer" points in a direction of vibration of linearly polarized light transmitted through the polarizer, and it is generally defined as an axis determining the polarization axis of polarized light transmitted through the polarizer.

When linearly polarized light transmitted through the first polarizer P1 enters the birefringent plate BP, the linearly polarized light is separated into a component having a polarization plane parallel to the C1 axis and a component having a polarization plane parallel to the C2 axis, and these two components propagate in the birefringent plate BP. Upon output from the birefringent plate BP, these two components are combined at a phase difference determined according to wavelength. In the case that the thickness of the birefringent plate BP is sufficiently larger than the wavelength of incident light, the polarization state of the light combined at the output of the birefringent plate BP differs based on wavelength. That is, the combined light can be linearly polarized light, or circularly, or elliptically polarized light according to wavelength. The transmittance of the second polarizer P2 depends on the polarization state of light incident on the second polarizer P2, and therefore differs according to wavelength. For example, assuming that the transmission axis of the second polarizer P2 is fixed so as to be parallel to linearly polarized light having a certain wavelength, the transmittance of the second polarizer P2 to the light of this wavelength is 100% in principle. At another wavelength, the transmittance of the second polarizer P2 to linearly polarized light perpendicular to the transmission axis of the second polarizer P2 is 0% in principle. Further, the transmittance of the second polarizer P2 to circularly polarized light having another wavelength is 50% in principle, and the transmittance of the second polarizer P2 to elliptically polarized light having another wavelength varies according to the ellipticity of the elliptically polarized light. Thus, the transmittance of this birefringent filter varies depending upon the wavelength of incident light.

Figure 2A:
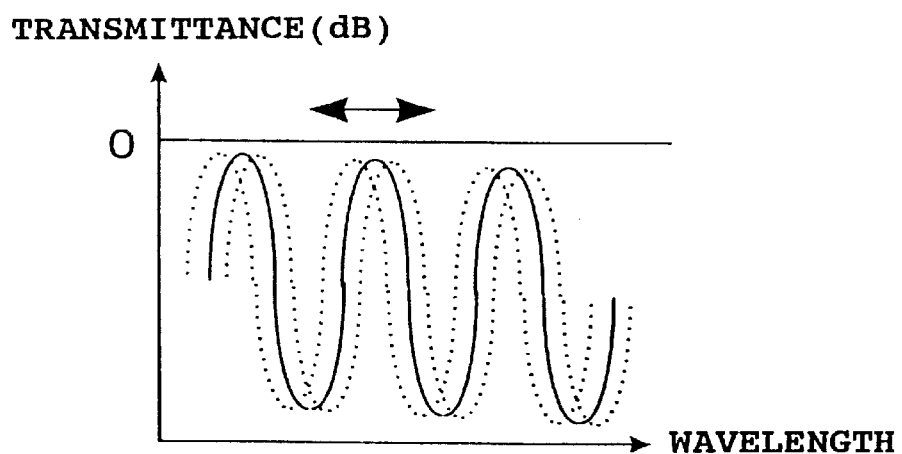
FIGS. 2A and 2B are graphs for illustrating a characteristic of a tunable optical filter in the prior art.
Figure 2B:
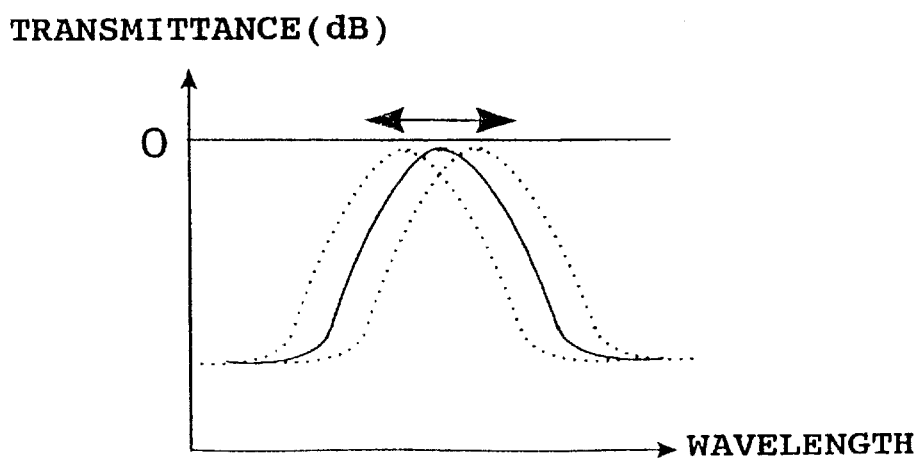

FIGS. 2A and 2B are graphs for illustrating a characteristic of a conventional tunable optical filter. In the tunable optical filter described in Japanese Patent Laid-open Publication No. 6-130339, for example, a phase shifter including a Faraday rotator and two quarter-wave plates is provided in place of the birefringent plate BP of the birefringent filter shown in FIG. 1, thereby obtaining a wavelength characteristic such that the transmittance periodically changes with wavelength. As shown by solid and broken lines in FIG. 2A, a characteristic curve giving this wavelength characteristic is variable in shape along the wavelength axis. Accordingly, by using this tunable optical filter, it is possible to provide an optical bandpass filter whose characteristic curve is variable in shape along the wavelength axis as shown in FIG. 2B.

Figure 3A:
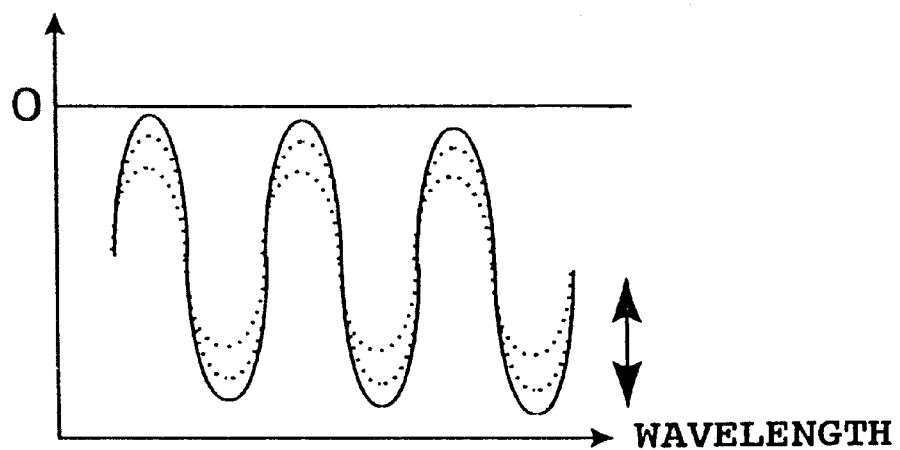
FIGS. 3A and 3B are graphs for illustrating a characteristic of a tunable optical filter required.
Figure 3B:
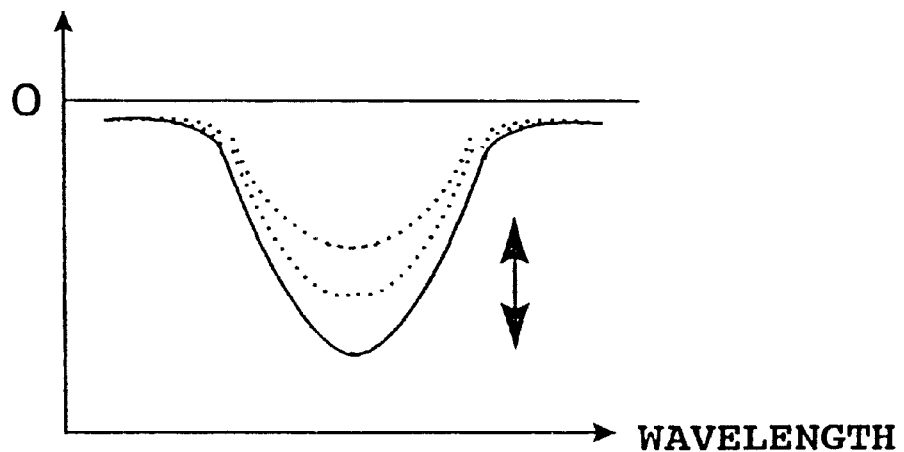

FIGS. 3A and 3B are graphs for illustrating a characteristic of a tunable optical filter required by the present invention. In FIG. 2A, the shape of the characteristic curve is variable along the wavelength axis. In contrast therewith, the tunable optical filter required by the present invention has a characteristic curve whose shape is variable along the transmittance axis as shown in FIG. 3A. More specifically, in consideration of use as a gain equalizer, it is required to realize a notch filter in which a loss depth in a rejection band is variable as shown as an example in FIG. 3B.

Figure 4:
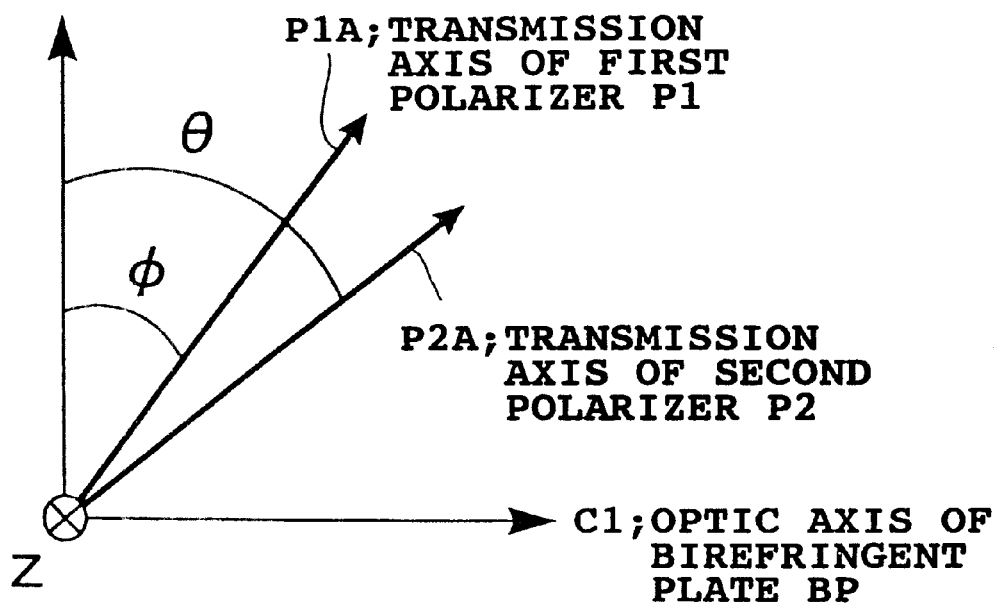
FIG. 4 is a view showing a positional relation among members of the birefringent filter shown in FIG. 1.

Now, quantitative analysis will be made on the birefringent filter shown in FIG. 1 and next developed into showing a method for providing a tunable optical filter having such a characteristic as shown in FIGS. 3A and 3B. It is now assumed that in the birefringent filter shown in FIG. 1 the transmission axis P1A of the first polarizer P1, the optic axes (C1 axis and C2 axis) of the birefringent plate BP, and the transmission axis P2A of the second polarizer P2 are in positional relation to each other as shown in FIG. 4. That is, let $\phi$ denote the angle formed between the transmission axis P1A and the C2 axis and $\theta$ denote the angle formed between the transmission axis P2A and the C2 axis.

When linearly polarized light $\sin(\omega t)$ enters the birefringent filter in a direction parallel to the transmission axis P1A, a component E1 of transmitted light through the birefringent plate BP parallel to the C1 axis and a component E2 of the transmitted light parallel to the C2 axis can be expressed as follows:

$$E1 = \sin\phi \, \sin(\omega t + \epsilon 1)$$

$$E2 = \cos\phi \, \sin(\omega t + \epsilon 2)$$

where $\epsilon 1$ and $\epsilon 2$ are the phase delays of the components E1 and E2 respectively. The amplitude of light emerging from the second polarizer P2 is given as follows:

$$E1 \sin\theta + E2 \cos\theta = \sin\phi \sin\theta \sin(\omega t + \epsilon 1) + \cos\phi \cos\theta \sin(\omega t + \epsilon 2) = (\sin\phi \sin\theta \cos\epsilon 1 + \cos\phi \cos\theta \cos\epsilon 2) \sin\omega t + (\sin\phi \sin\theta \sin\epsilon 1 + \cos\phi \cos\theta \sin\epsilon 2) \cos\omega t$$

Accordingly, the intensity I of transmitted light is given as follows:

$$I = \cos^2(\phi+\theta) + \sin(2\phi) \sin(2\theta) \cos^2((\epsilon 1 - \epsilon 2)/2)$$

Letting d denote the thickness of the birefringent plate BP, $\mu$ denote the refractive index difference between an ordinary ray and an extraordinary ray in the birefringent plate BP, and $\lambda$ denote the wavelength, the following equation holds.

$$(\epsilon 1 - \epsilon 2)/2 = \pi \mu d/\lambda$$

Accordingly, the intensity I of transmitted light can be expressed as a function $I(\lambda)$ of wavelength $\lambda$ to give Eq. (1).

$$I(\lambda) = \cos^2(\phi+\theta) + \sin(2\phi) \sin(2\theta) \cos^2(\pi\mu d/\lambda) \qquad (2)$$

As understood from Eq. (1), the transmitted light intensity has wavelength dependence and periodically changes with wavelength. If the value of wavelength $\lambda$ is higher than an actually operating wavelength band, $1/\lambda$ can be approximated by a linear function as follows:

$$1/\lambda = a\lambda + b$$

Figure 5:
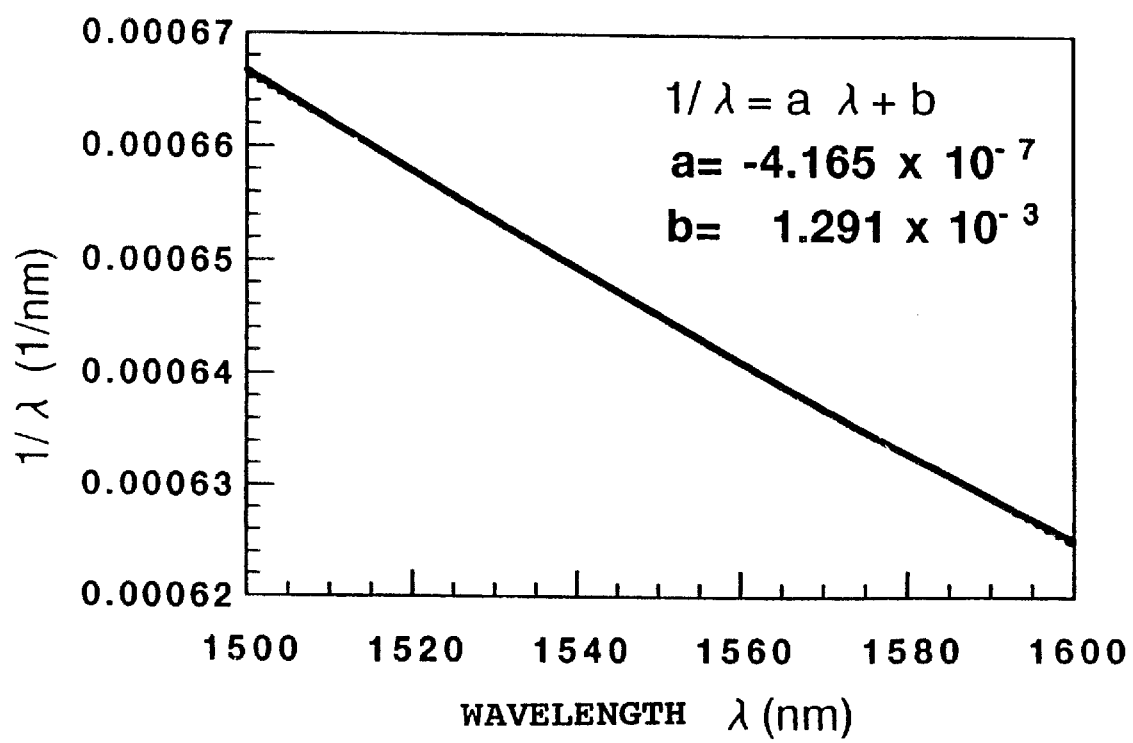
FIG. 5 is a graph for illustrating (1/λ) approximated by a linear function.

If the wavelength band is set to a range of 1500 nm to 1600 nm as shown in FIG. 5, for example, $a = -4.165 \times 10^{-7}$ (1/nm$^2$) and $b = 1.291 \times 10^{-3}$ (1/nm).

Neglecting b and considering only a relative wavelength, Eq. (1)' is given.

$$I(\lambda)=\cos^2(\phi+\theta)+\sin(2\phi)\sin(2\theta)\cos^2(\pi\lambda/FSR) \qquad (1)'$$

where FSR (Free Spectral Range) represents a wavelength period in a wavelength characteristic of transmittance, and it is expressed as follows:

$$FSR=1/\mu d \qquad (2)$$

Accordingly, it is understood that a required FSR can be obtained by adjusting the thickness d of the birefringent plate BP provided that the refractive index difference $\mu$ determined by the material of the birefringent plate BP is constant.

Figure 6:
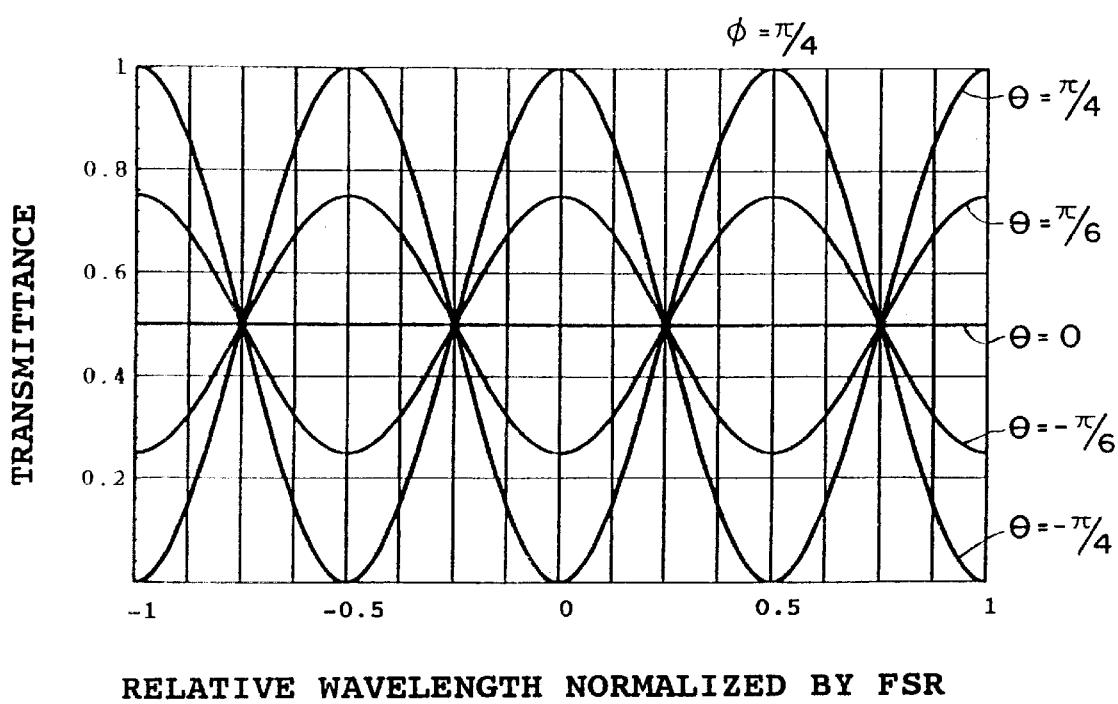
FIG. 6 is a graph showing a change in wavelength characteristic of transmittance with a change in an angle θ defined in FIG. 4.

Eq. (1) shows that the transmitted light intensity changes with a change in angle $\phi$ and/or angle $\theta$. Referring to FIG. 6, there is shown a change in wavelength characteristic of transmittance in the case that the angle $\theta$ is changed with the angle $\phi$ fixed to $\pi/4$ (45°), for example. In FIG. 6, the vertical axis represents transmittance (true value) and the horizontal axis represents relative wavelength normalized by FSR. The signs attached to the values of the angle $\theta$ having positive and negative value are intended to show relative rotational directions between the C2 axis and the transmission axis P2A, which will be hereinafter described in detail.

A direct method for changing the angle $\theta$ is to rotate the transmission axis P2A of the second polarizer P2. In present techniques, any polarizer capable of rotating its transmission axis without using mechanical means is not known. Although a polarizer capable of rotating its transmission axis can be provided by using mechanical means, a tunable optical filter having a mechanically movable part has problems such that high-speed operation is difficult and reliability is lacking. In view of this fact, the present invention has proposed a method using a variable Faraday rotator as will be hereinafter described in detail.

The angle $\theta$ is an angle formed between the transmission axis P2A of the second polarizer P2 and the C2 axis, and it can be said that the angle $\theta$ is an angle formed between the polarization axis of light incident on the second polarizer P2 and the transmission axis P2A of the second polarizer P2. In other words, "rotating the transmission axis P2A of the second polarizer P2" is substantially the same as "rotating the polarization axis of light incident on the second polarizer P2". Accordingly, by locating a Faraday rotator for giving a variable Faraday rotation angle between the birefringent plate BP and the second polarizer P2, and by rotating an azimuth of polarized light incident on the second polarizer P2, the same condition as that obtained by changing the angle $\theta$ can be realized, and the transmitted light intensity can therefore be changed according to the rotation of the azimuth.

Similarly, by locating a variable Faraday rotator between the first polarizer P1 and the birefringent plate BP, and by rotating an azimuth of polarized light incident on the birefringent plate BP, the same condition as that obtained by changing the angle $\phi$ can be realized, and the transmitted light intensity can therefore be changed according to the rotation of the azimuth.

Figure 7A:
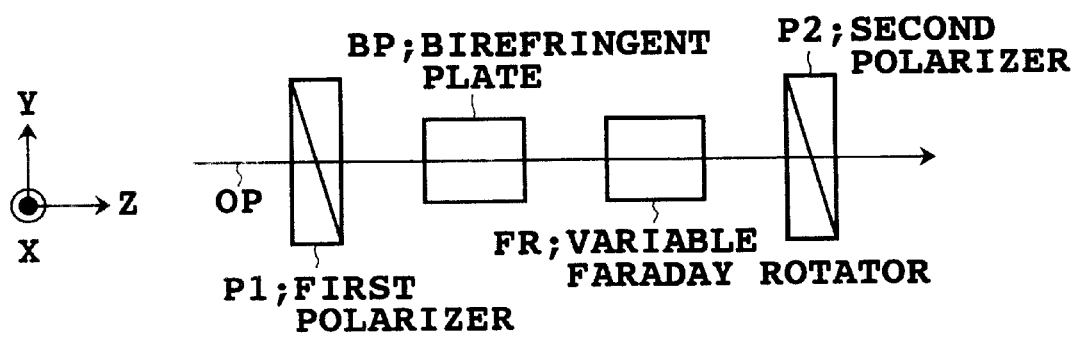
FIGS. 7A and 7B are views showing first and second preferred embodiments of the tunable optical filter according to the present invention respectively.
Figure 7B:
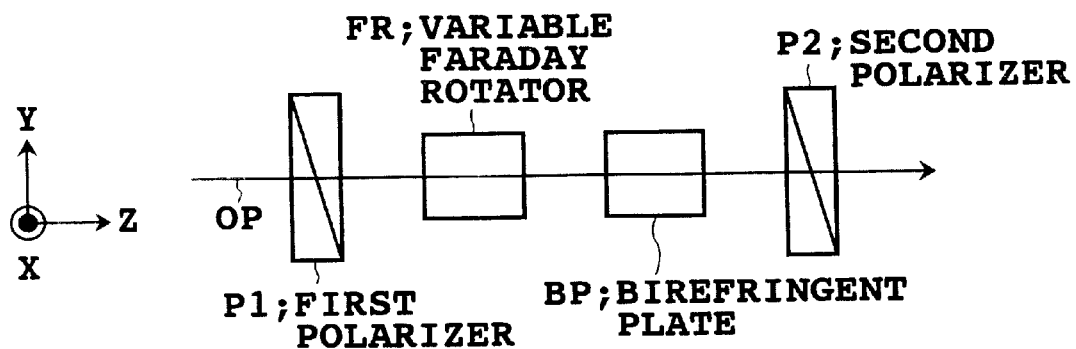

Referring to FIGS. 7A and 7B, there are shown first and second preferred embodiments of the tunable optical filter according to the present invention respectively. In the first preferred embodiment shown in FIG. 7A, a variable Faraday rotator FR is provided between the birefringent plate BP and the second polarizer P2. In the second preferred embodiment shown in FIG. 7B, a variable Faraday rotator FR is provided between the first polarizer P1 and the birefringent plate BP.

The simplest and clearest requirements for carrying out the tunable optical filter according to the present invention in each of the first and second preferred embodiments will now be reconfirmed. In each preferred embodiment, the birefringent plate BP and the variable Faraday rotator FR are provided between the first polarizer P1 and the second polarizer P2. The first polarizer P1 has a transmission axis P1A determining the polarization axis of transmitted polarized light, and the second polarizer P2 has a transmission axis P2A determining the polarization axis of transmitted polarized light. The birefringent plate BP has optic axes (C1 axis and C2 axis, or any one of them) determining a phase difference given between two orthogonal components of transmitted polarized light. The variable Faraday rotator FR gives a variable Faraday rotation angle to transmitted polarized light. The order of arrangement of the birefringent plate BP and the variable Faraday rotator FR, and the relative positional relation between the optic axis (e.g., C1 axis) and the transmission axes P1A and P2A are set so that the shape of a characteristic curve giving a wavelength characteristic of transmittance changes along the transmittance axis according to a change in the Faraday rotation angle.

Further, the thickness of the birefringent plate BP is designed so that a required FSR can be obtained. To realize wavelength dependence of transmittance, a birefringent plate having a thickness larger than that of a quarter-wave plate or a half-wave plate, specifically, having a thickness sufficiently larger than an operating wavelength, is used as the birefringent plate BP. More specifically, a birefringent plate capable of giving a phase difference corresponding to a length 20 to 100 times an operating wavelength is adopted as the birefringent plate BP.

In the first preferred embodiment shown in FIG. 7A, input light is transmitted through the first polarizer P1, the birefringent plate BP, the variable Faraday rotator FR, and the second polarizer P2 in this order along the optical path OP.

In the second preferred embodiment shown in FIG. 7B, input light is transmitted through the first polarizer P1, the variable Faraday rotator FR, the birefringent plate BP, and the second polarizer P2 in this order along the optical path OP.

Figure 8:
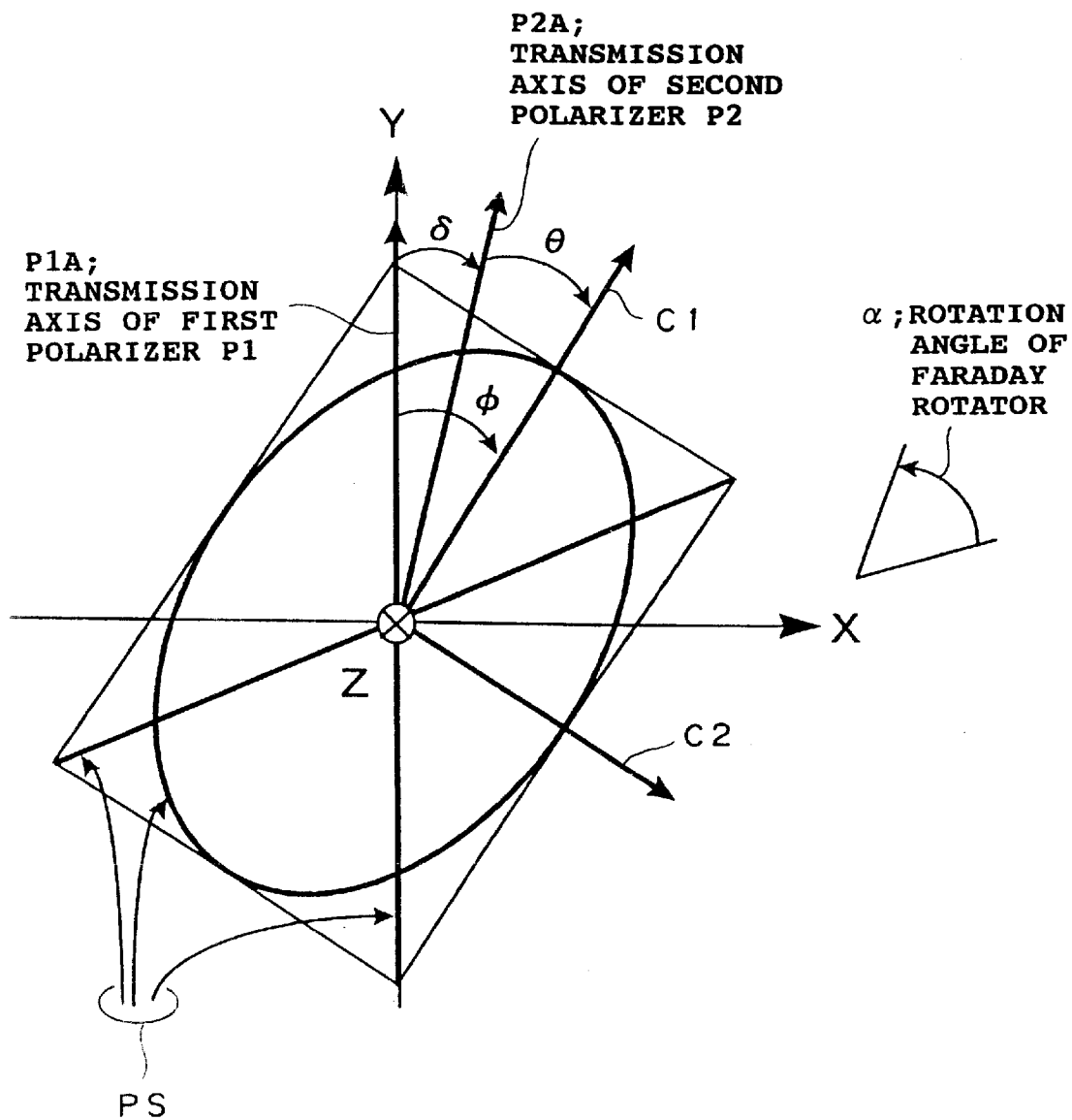
FIG. 8 is a view showing a positional relation among members of each preferred embodiment of the tunable optical filter according to the present invention.

FIG. 8 shows a positional relation among the members in each preferred embodiment of the tunable optical filter according to the present invention. It is assumed that in the orthogonal three-dimensional coordinate system (X, Y, Z) the Z axis is parallel to the optical path OP, and the Y axis is parallel to the transmission axis P1A of the first polarizer P1. Further, $\phi$, $\theta$, and $\delta$ will be defined newly or more precisely as follows:

$\phi$: angle formed between the C1 axis of the birefringent plate BP and the transmission axis P1A (Y axis) of the first polarizer P1. It is assumed that the angle $\phi$ takes a positive sign when rotating clockwise from the Y axis toward the C1 axis.

$\theta$: angle formed between the C1 axis of the birefringent plate BP and the transmission axis P2A of the second polarizer P2. It is assumed that the angle $\theta$ takes a positive sign when rotating clockwise from the transmission axis P2A toward the C1 axis.

$\delta$: angle formed between the transmission axis P1A (Y axis) of the first polarizer P1 and the transmission axis P2A of the second polarizer P2. It is assumed that the angle $\delta$ takes a positive sign when rotating clockwise from the Y axis toward the transmission axis P2A.

Accordingly, $\phi=\theta+\delta$. Further, the Faraday rotation angle a given by the Faraday rotator FR takes a positive sign when rotating counterclockwise from the X axis toward the Y axis.

In FIG. 8, the group of an ellipse (including a circle) and straight lines represented by reference symbol PS represents wavelength dependence of a polarization state at the output of the birefringent plate BP in the case of α=0.

To make the transmitted light intensity of the tunable optical filter have wavelength dependence, the condition that "sin(2φ) sin(2θ) is always zero" must be avoided as apparent from Eq. (1). Therefore, in the case of providing the same condition as that obtained by substantially changing the angle θ by using the Faraday rotator FR as described in the first preferred embodiment shown in FIG. 7A, the angle φ must satisfy φ≠nπ/2 (n is an integer). Further, in the case of providing the same condition as that obtained by substantially changing the angle φ by using the Faraday rotator FR as described in the second preferred embodiment shown in FIG. 7B, the angle θ must satisfy θ≠nπ/2 (n is an integer).

According to the optical theory, a polarization state of light and an operation of an optical element acting on its transmitted light can be represented by a 1×2 matrix known as the Jones Vector and a 2×2 matrix known as the Jones Matrix. Further, optical power at each transmission point can be expressed as the sum of the squares of two components of the Jones Vector. By matrix calculation using the Jones Vector and the Jones Matrix, the transmittance (power transmittance) of the tunable optical filter according to the present invention can be calculated.

Figure 9:
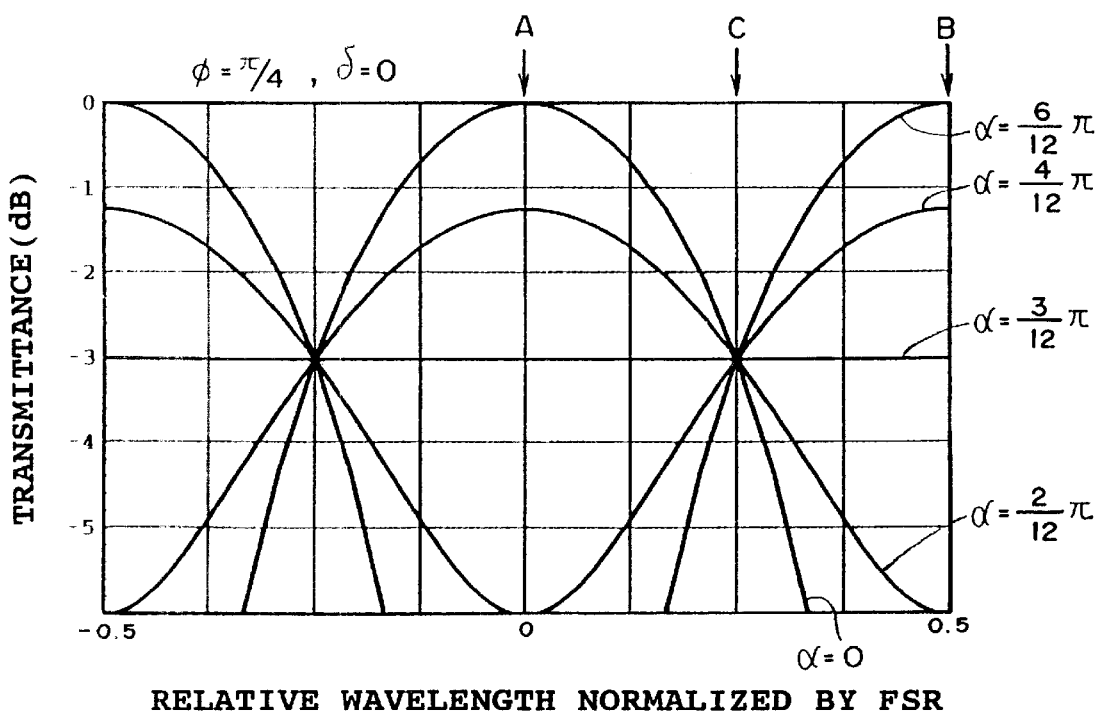
FIG. 9 is a graph showing a first example of the wavelength characteristic of transmittance in the present invention.

FIG. 9 shows the results of calculation of a wavelength characteristic of transmittance in the first preferred embodiment shown in FIG. 7A under the conditions that the angles φ and δ are set to φ=πn/4 and δ=0, and the Faraday rotation angle α is changed. In FIG. 9, the vertical axis represents transmittance (dB) and the horizontal axis represents relative wavelength normalized by FSR. As apparent from FIG. 9, the shape of the characteristic curve giving the wavelength characteristic of transmittance changes along the transmittance axis (the vertical axis) with a change in the Faraday rotation angle a in the condition that the points corresponding to relative wavelengths of 0.25 and −0.25 are fixed points.

By changing the Faraday rotation angle α in the range of −δ<α<π/2−δ (range of π/2) in the case of φ=π/4, or in the range of −δ>α>−π/2−δ (range of π/2) in the case of φ=−π/4, all obtainable conditions of the wavelength characteristic of transmittance can be realized.

According to this relation, it is understood that in the case of δ=0, that is, in the case that the transmission axes P1A and P2A are made parallel to each other, it is sufficient to select either a positive sign or a negative sign for the Faraday rotation angle a to be changed. Accordingly, by setting δ=0, 0<α<π/2 or 0>α>−π/2 is given, so that a Faraday rotator giving a Faraday rotation angle a in only one direction can,be used, thereby simplifying the configuration of the Faraday rotator FR. This effect is similarly exhibited also in the second preferred embodiment shown in FIG. 7B.

Conversely, by using a variable Faraday rotator capable of giving a Faraday rotation angle α in opposite directions and setting δ=φ, the transmittance becomes constant irrespective of wavelength when α=0. For example, in the case that the tunable optical filter according to the present invention is incorporated into a system, there is a case that a constant transmittance is preferable irrespective of wavelength when control becomes off to result in α=0. In this case, −π/4<α<π/4 holds, so that the absolute value of the Faraday rotation angle α is smaller than π/4. Accordingly, in the case that a variable Faraday rotator applying a magneto-optic effect is used, it is possible to reduce the power consumption when the Faraday rotation angle α is set to a maximum value. Similar discussions apply also to the second preferred embodiment shown in FIG. 7B, in which it is sufficient to set δ=θ.

Figure 10:
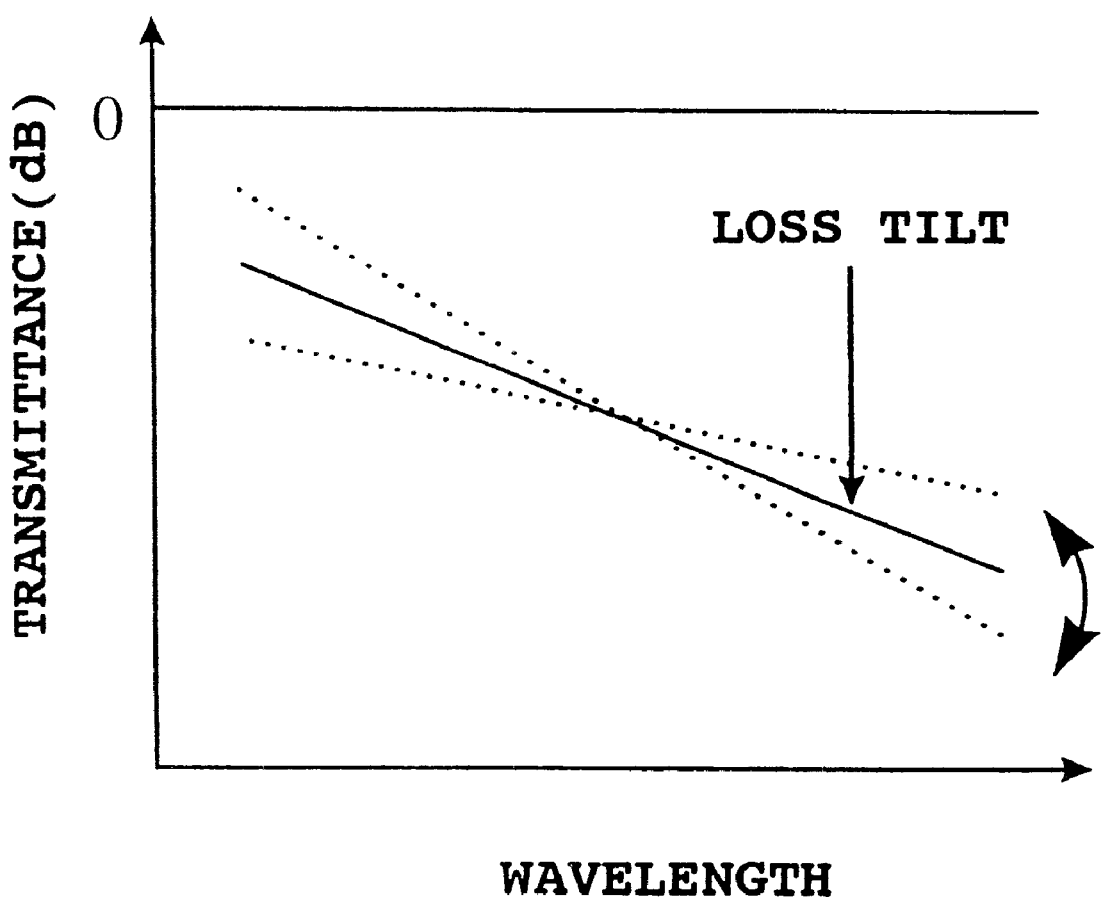
FIG. 10 is a graph for illustrating loss tilt.

The tunable optical filter having such a characteristic as shown in FIG. 9 is potentially applied to a power equalizer having a variable loss tilt, for example. The term of "loss tilt" indicates a slope of a linear characteristic curve giving a wavelength characteristic of transmittance represented by logarithm as shown in FIG. 10. Such a power equalizer having a variable loss tilt is effective in equalizing gain tilt in an optical amplifier or in compensating for loss tilt in an optical fiber in an optical fiber communication system, for example.

In the case of using the tunable optical filter having such a characteristic as shown in FIG. 9 as an equalizer having a variable loss tilt, an average of losses in an operating wavelength band (which will be hereinafter referred to as "average loss") can be maintained constant by selecting the operating wavelength band in the following manner, for example. That is, a center value between adjacent two wavelengths of some wavelengths providing a maximum loss or a minimum loss is selected as a center wavelength in the operating wavelength band, and the bandwidth of the operating wavelength band is set smaller than ½ of FSR.

Figure 11:
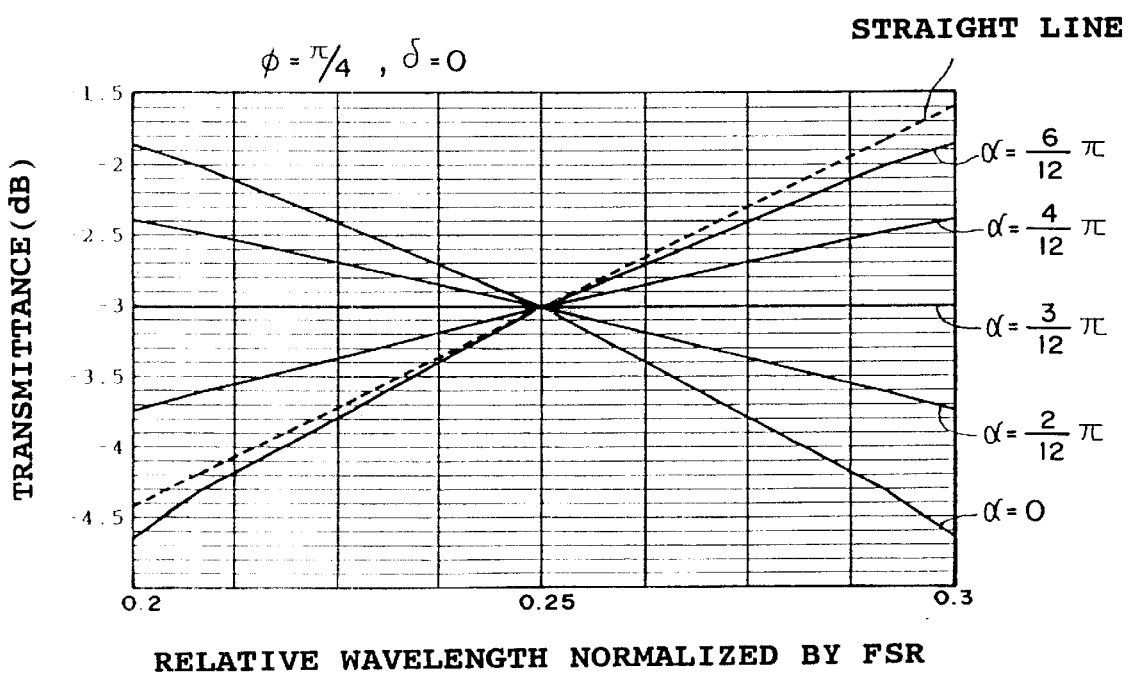
FIG. 11 is a graph showing a second example of the wavelength characteristic of transmittance in the present invention.

FIG. 11 shows an example obtained by selecting a point C which gives a center value between a point A and a point B each providing a maximum loss or a minimum loss in the graph shown in FIG. 9 as a center wavelength in the operating wavelength band, and by setting the bandwidth of the operating wavelength band to ⅕ of FSR. As apparent from FIG. 11, a characteristic with a variable loss tilt is obtained. Further, as also apparent from FIG. 11, the average loss does not change irrespective of a change in the Faraday rotation angle α. In the graph shown in FIG. 11, a perfect straight line shown by a broken line clearly indicates that each characteristic curve is substantially linear (as also in the cases of FIGS. 13 and 16).

However, the tunable optical filter having the characteristic of FIG. 11 has a problem that the average loss is as large as 3 dB. To solve this problem, the following two methods are considered.

The first method is a method of making the angle (φ or θ) between one of the transmission axes P1A and P2A and the C1 axis of the birefringent plate BP different from ±π/4.

For example, in the first preferred embodiment shown in FIG. 7A, the angle φ is set so as to satisfy 0 <φ<π/4 and the Faraday rotation angle α is changed in the range of −δ<α<2φ−δ. Alternatively, the angle φ is set so as to satisfy −π/4<φ<0 and the Faraday rotation angle α is changed in the range of −δ>α>2φ−δ.

Figure 12A:
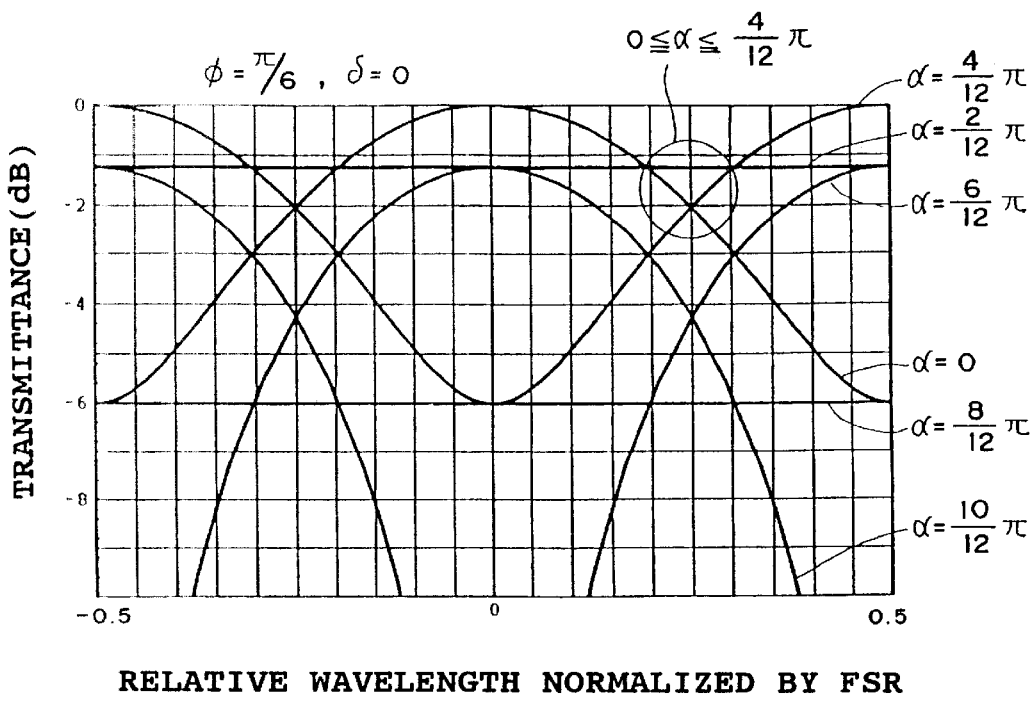
FIGS. 12A and 12B are graphs showing a third example of the wavelength characteristic of transmittance in the present invention.
Figure 12B:
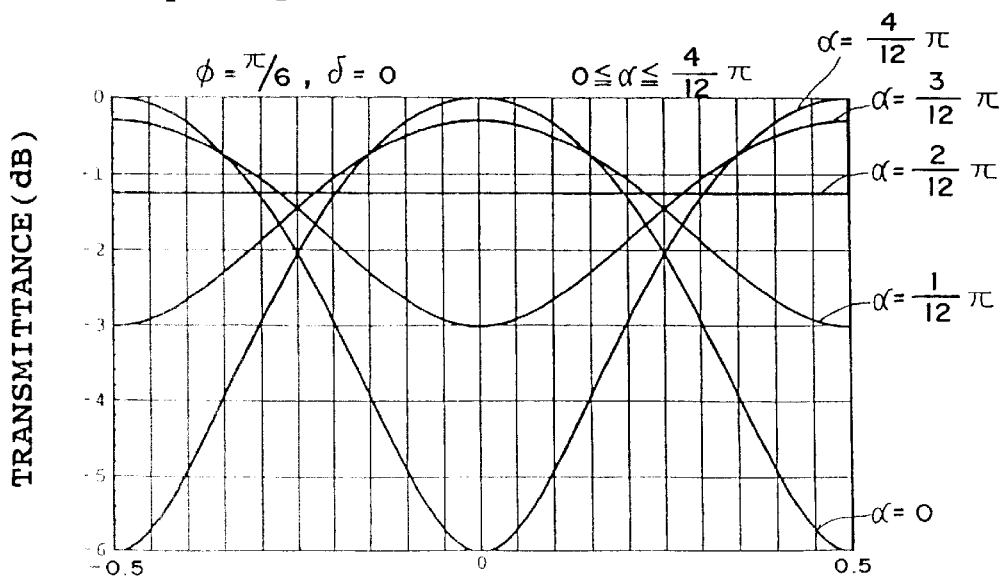
Figure 13:
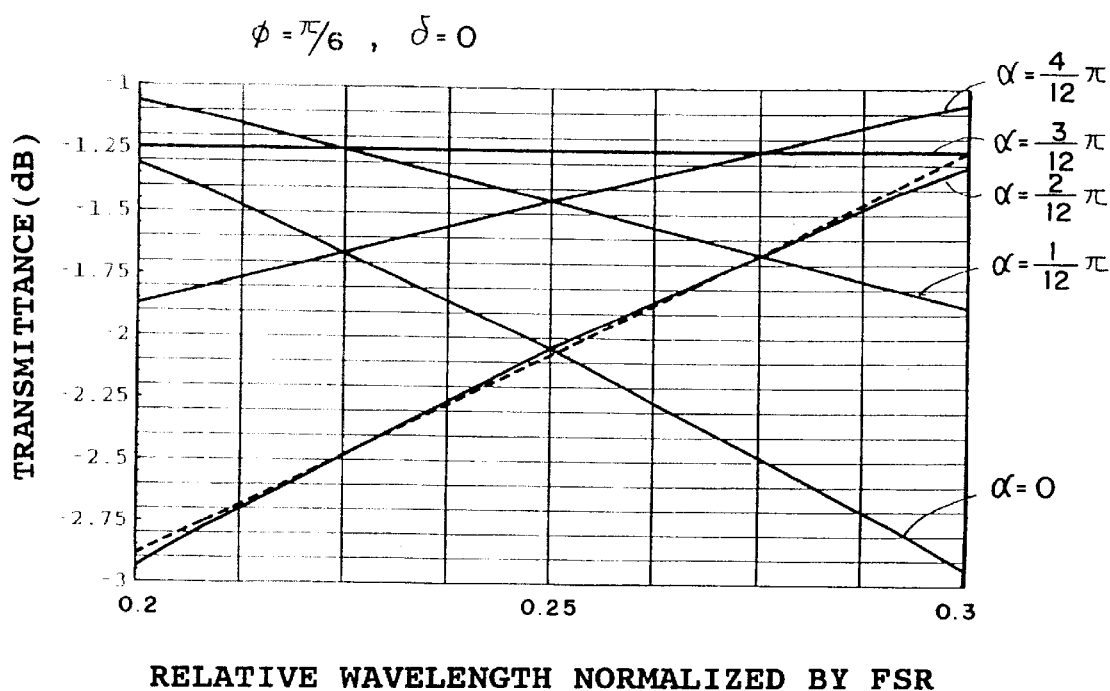
FIG. 13 is a graph showing a fourth example of the wavelength characteristic of transmittance in the present invention.

FIGS. 12A and 12B show the results of calculation of a wavelength characteristic of transmittance under the conditions that the angles φ and δ are set to φ=π/6 and δ=0 and the Faraday rotation angle α is changed. FIG. 13 shows a wavelength characteristic obtained by enlarging a part of the wavelength characteristic shown in FIGS. 12A and 12B in accordance with the relative wavelength range shown in FIG. 11. As apparent from FIG. 13, the average loss is smaller than that of the wavelength characteristic shown in FIG. 11. However, the average loss changes with a change in the Faraday rotation angle α in the example of FIG. 13.

In the second preferred embodiment shown in FIG. 7B, the angle θ is set so as to satisfy 0<θ<π/4 and the Faraday rotation angle a is changed in the range of −δ>α>−2θ−δ. Alternatively, the angle θ is set so as to satisfy −π/4<θ<0 and the Faraday rotation angle α is changed in the range of −δ<α<−2θ−δ. Also in this case, an effect similar to that in the first preferred embodiment shown in FIG. 7A can be obtained.

Also in the above case of making the angle φ or θ different from ±π/4 according to the first method, a variable Faraday rotator capable of giving a Faraday rotation angle α in only one direction can be used by setting δ=0. Further, by setting δ=φ in the first preferred embodiment shown in FIG. 7A, or by setting δ=θ in the second preferred embodiment shown in FIG. 7B, the transmittance can be maintained constant irrespective of wavelength when control becomes off to result in α=0.

Figure 14A:
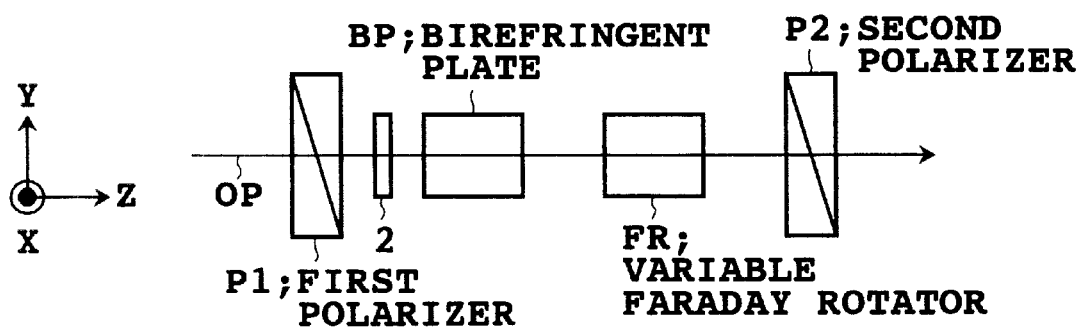
FIGS. 14A and 14B are views showing third and fourth preferred embodiments of the tunable optical filter according to the present invention respectively.
Figure 14B:
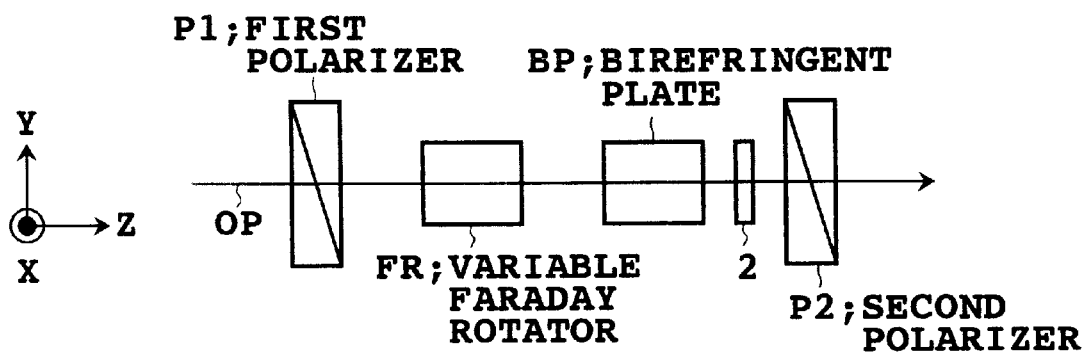

The effect obtained by making the angle φ or θ different from ±π/4 can be realized also by inserting a quarter-wave plate at a proper position with a proper angle to change a polarization orientation as shown in each of FIGS. 14A and 14B.

FIG. 14A shows a third preferred embodiment of the tunable optical filter according to the present invention. In contrast with the first preferred embodiment shown in FIG. 7A, the third preferred embodiment is characterized in that a quarter-wave plate 2 is additionally provided between the first polarizer P1 and the birefringent plate BP.

FIG. 14B shows a fourth preferred embodiment of the tunable optical filter according to the present invention. In contrast with the second preferred embodiment shown in FIG. 7B, the fourth preferred embodiment is characterized in that a quarter-wave plate 2 is additionally provided between the birefringent plate BP and the second polarizer P2.

The second method is a method of using a partial polarizer as the second polarizer P2. The term of "partial polarizer" refers to a polarizer indicating a transmittance value not equal to 0 (antilogarithm) upon incidence of linearly polarized light having a polarization plane orthogonal to the transmission axis. In the partial polarizer, the transmittance of linearly polarized light having a polarization plane orthogonal to the transmission axis is defined as t.

Figure 15:
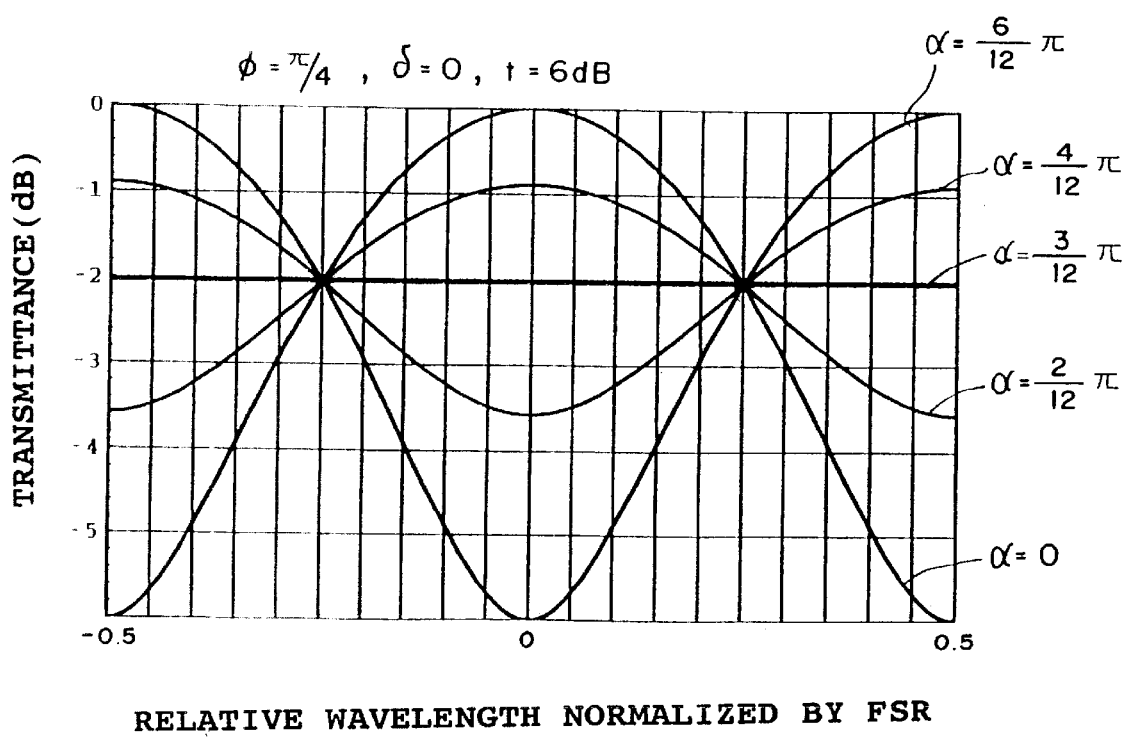
FIG. 15 is a graph showing a fifth example of the wavelength characteristic of transmittance in the present invention.

FIG. 15 shows the results of calculation of a wavelength characteristic of transmittance by using a partial polarizer having a transmittance t=0.25 (−6 dB) as the second polarizer P2 under the conditions that the angles φ and δ are set to φ=π/4 and δ=0 and the Faraday rotation angle α is changed.

Figure 16:
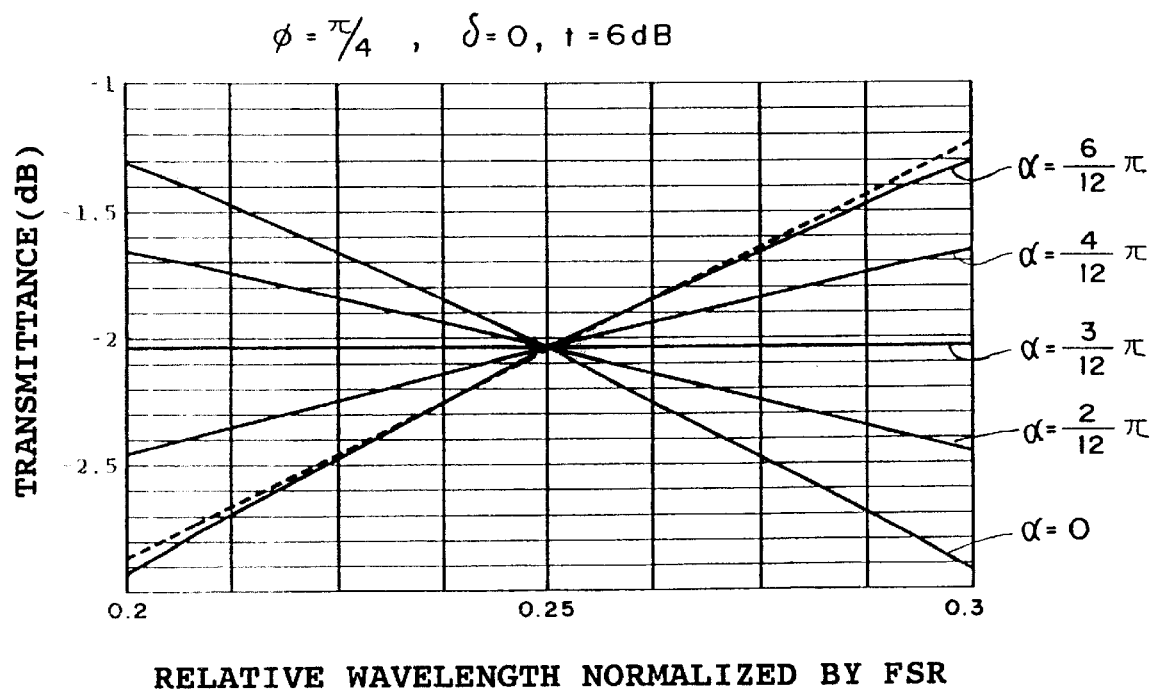
FIG. 16 is a graph showing a sixth example of the wavelength characteristic of transmittance in the present invention.

FIG. 16 shows a wavelength characteristic obtained by enlarging a part of the wavelength characteristic shown in FIG. 15. As compared with the characteristic shown in FIG. 11, the average loss is smaller in the characteristic shown in FIG. 16. Furthermore, the average loss does not change with a change in the Faraday rotation angle α.

In the case of carrying out the second method in the first preferred embodiment shown in FIG. 7A, a variable amount (a variable range of transmittance at a certain wavelength) can be maximized by setting φ=±π/4, because all obtainable conditions of the wavelength characteristic of transmittance can be realized as previously mentioned. In the case of carrying out the second method in the second preferred embodiment shown in FIG. 7B, a variable amount can similarly be maximized by setting θ=±π/4.

Also in the case of carrying out the second method, a variable Faraday rotator capable of giving a Faraday rotation angle in only one direction can be used by setting δ=0. Further, by setting δ=φ in the first preferred embodiment shown in FIG. 7A, or by setting δ=θ in the second preferred embodiment shown in FIG. 7B, the transmittance can be maintained constant irrespective of wavelength when control becomes off to result in α=0.

The first and second methods are effective also in giving a finite value to the maximum loss. For example, in the case of setting φ=π/4 in the first preferred embodiment shown in FIG. 7A, the power transmittance takes 0 (antilogarithm) in principle, so that the maximum loss (dB) becomes infinite as apparent from FIG. 9. In some case, such a characteristic is undesirable in operating a system. By using the first or second method, the maximum loss (dB) can be suppressed to a finite value. This will become apparent from FIGS. 12A and 12B and FIG. 15.

Figure 17:
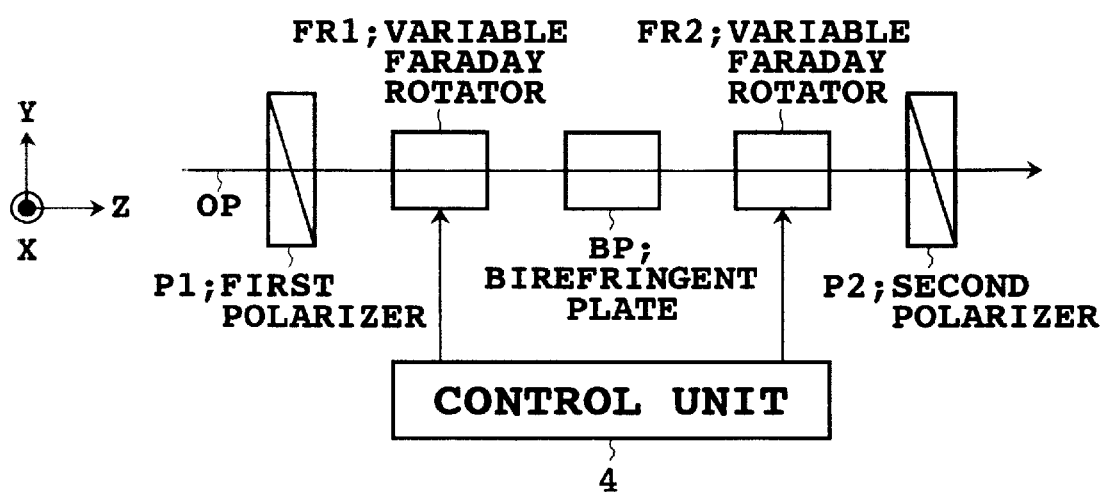
FIG. 17 is a view showing a fifth preferred embodiment of the tunable optical filter according to the present invention.

FIG. 17 shows a fifth preferred embodiment of the tunable optical filter according to the present invention. In each of the previous preferred embodiments, a single variable Faraday rotator FR is used. In contrast therewith, the fifth preferred embodiment is characterized in that two variable Faraday rotators FR1 and FR2 are provided between the first polarizer P1 and the second polarizer P2. The birefringent plate BP is provided between the Faraday rotators FR1 and FR2. This configuration can provide a wavelength characteristic different from each wavelength characteristic mentioned above.

For example, consider the case of rotating a Faraday rotation angle α1 given by the Faraday rotator FR1 and a Faraday rotation angle α2 given by the Faraday rotator FR2 with the relation of α1=α2 maintained under the conditions that the angles φ and δ are set to φ=±π/4 and δ=nπ/2 (n is an integer). Input light is transmitted through the first polarizer P1, the Faraday rotator FR1, the birefringent plate BP, the Faraday rotator FR2, and the second polarizer P2 in this order along the optical path OP.

Figure 18:
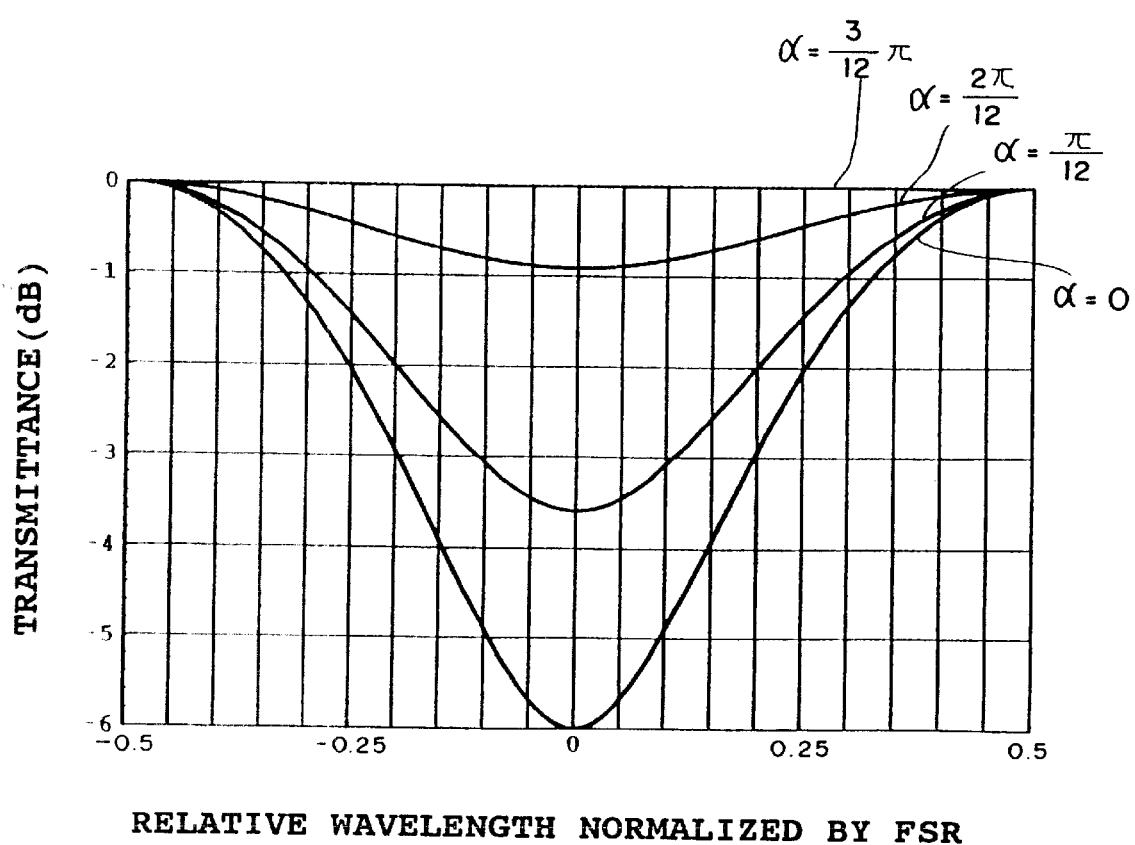
FIG. 18 is a graph showing a seventh example of the wavelength characteristic of transmittance in the present invention.

FIG. 18 shows a wavelength characteristic of transmittance in the case of rotating the Faraday rotation angle α (α1 and α2) in the range of 0<α<π/4 under the conditions that the angle φ and δ are set to φ=π/4 and δ=0. In this case, a partial polarizer is used as the second polarizer P2. As apparent from FIG. 18, the minimum loss in the wavelength characteristic of transmittance is always zero irrespective of the Faraday rotation angle α.

To change each Faraday rotation angle with the relation of α1=α2 maintained, the fifth preferred embodiment shown in FIG. 17 employs a control unit 4 connected to the Faraday rotators FR1 and FR2. The control unit 4 controls the Faraday rotators FR1 and FR2 so that the Faraday rotation angle α1 given by the Faraday rotator FR1 and the Faraday rotation angle α2 given by the Faraday rotator FR2 become substantially equal to each other.

Figure 19:
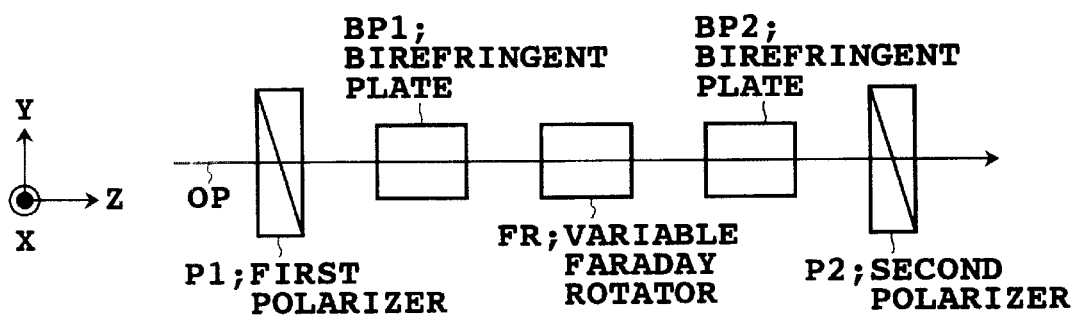
FIG. 19 is a view showing a sixth preferred embodiment of the tunable optical filter according to the present invention.

FIG. 19 shows a sixth preferred embodiment of the tunable optical filter according to the present invention. In each of the previous preferred embodiments, a single birefringent plate BP is used. In contrast therewith, the sixth preferred embodiment is characterized in that two birefringent plates BP1 and BP2 are provided between the first polarizer P1 and the second polarizer P2. The variable Faraday rotator FR is provided between the birefringent plates BP1 and BP2. Input light is transmitted through the first polarizer P1, the birefringent plate BP1, the Faraday rotator FR, the birefringent plate BP2, and the second polarizer P2 in this order along the optical path OP.

By using the two birefringent plates BP1 and BP2, a wavelength characteristic like the wavelength characteristic shown in FIG. 18 can be obtained. For example, angles φ1 and φ2 are defined with respect to the optic axes of the birefringent plates BP1 and BP2 respectively, as similarly to the angle φ mentioned above, and the angles φ1 and φ2 are set equal to each other (φ1=φ2). Further, the angles φ1, φ2, and δ are set to φ1=±π/4, φ2=±π/4, and δ=nπ/2 (n is an integer).

Figure 20:
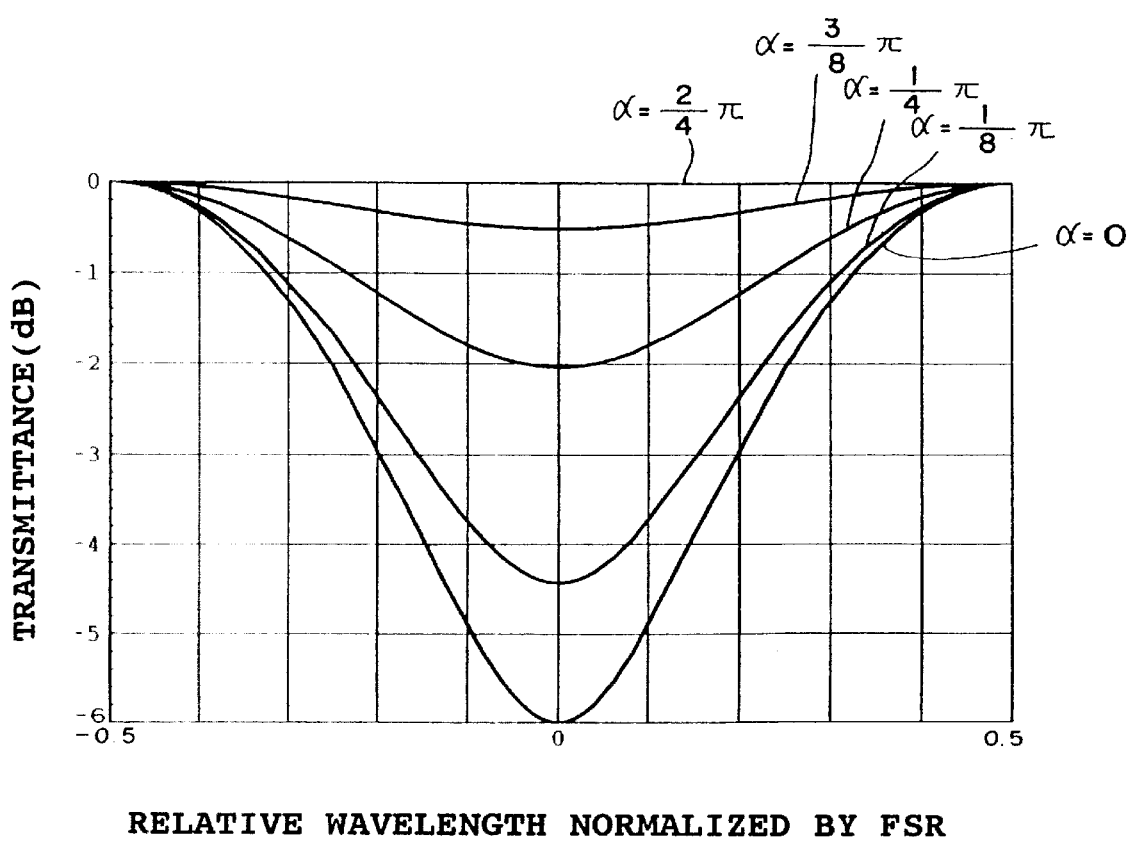
FIG. 20 is a graph showing an eighth example of the wavelength characteristic of transmittance in the present invention.

FIG. 20 shows a wavelength characteristic of transmittance in the case of rotating the Faraday rotation angle α given by the Faraday rotator FR in the range of 0<α<π/2 under the conditions that the angles φ1, φ2, and δ are set to $\phi 1 = \phi 2 = \pi/4$ and $\delta = 0$. In this case, a partial polarizer is used as the second polarizer P2. As apparent from FIG. 20, the minimum loss in the wavelength characteristic of transmittance is always zero irrespective of the Faraday rotation angle $\alpha$.

Also in the sixth preferred embodiment shown in FIG. 19, a Faraday rotator capable of giving a variable Faraday rotation angle in only one direction can be used by setting $\delta = 0$.

Figure 21:
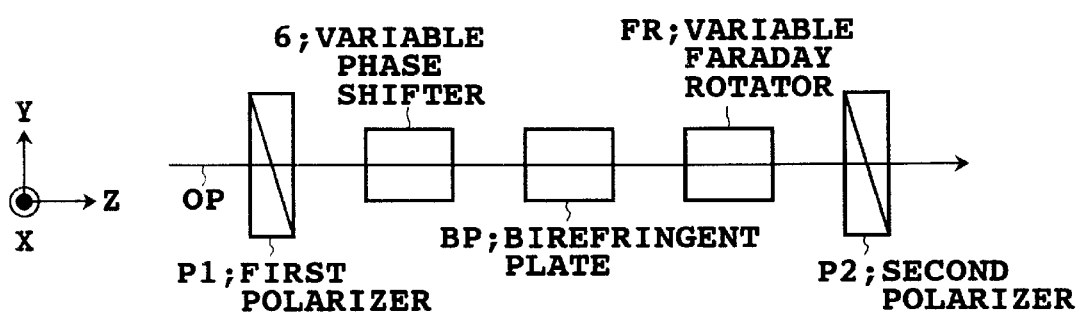
FIG. 21 is a view showing a seventh preferred embodiment of the tunable optical filter according to the present invention.

FIG. 21 shows a seventh preferred embodiment of the tunable optical filter according to the present invention. This preferred embodiment is characterized in that a variable phase shifter 6 is additionally provided between the first polarizer P1 and the second polarizer P2. The variable phase shifter 6 gives a phase difference (retardation) between a polarization component parallel to its optic axis and a polarization component orthogonal to its optic axis. The phase difference is made variable by a control signal supplied to the variable phase shifter 6. The first polarizer P1, the birefringent plate BP, the variable Faraday rotator FR, and the second polarizer P2 are arranged in accordance with the first preferred embodiment shown in FIG. 7A. Further, the variable phase shifter 6 is provided between the first polarizer P1 and the birefringent plate BP.

According to the preferred embodiment shown in FIG. 21, the shape of a characteristic curve giving a wavelength characteristic of transmittance changes not only with a change in the Faraday rotation angle given by the variable Faraday rotator FR along the transmittance axis, but also with a change in the phase difference given by the variable phase shifter 6 along the wavelength axis. Consequently, not only the characteristic of the tunable optical filter described with reference to FIGS. 3A and 3B, but also the characteristic of the tunable optical filter described with reference to FIGS. 2A and 2B can be obtained.

To most effectively change the shape of the characteristic curve along the wavelength axis, it is preferable to set the angle between the optic axis of the variable phase shifter 6 and the optic axis of the birefringent plate BP to $n\pi/2$ (n is an integer).

As the variable phase shifter 6, an optical element applying an electro-optic effect such as LiNbO$_3$ may be adopted. However, such a variable phase shifter applying an electro-optic effect requires a high drive voltage in general.

Figure 22:
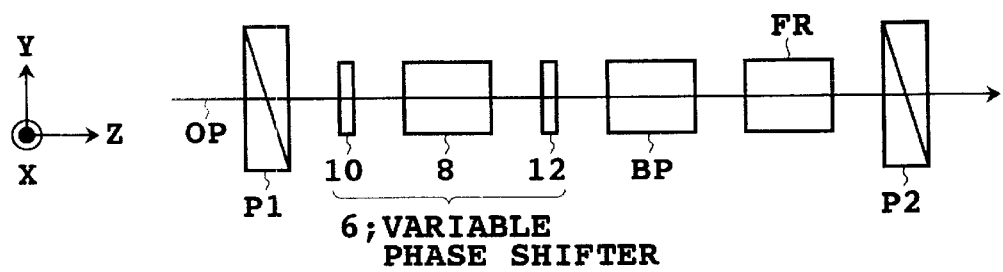
FIG. 22 is a view showing an eighth preferred embodiment of the tunable optical filter according to the present invention.

FIG. 22 shows an eighth preferred embodiment of the tunable optical filter according to the present invention. This preferred embodiment employs a variable phase shifter 6 having a specific configuration to aim at decreasing the drive voltage for the variable phase shifter 6. The variable phase shifter 6 shown in FIG. 22 includes two quarter-wave plates 10 and 12 and another variable Faraday rotator 8 provided between the quarter-wave plates 10 and 12. The angle formed between the optic axis of the quarter-wave plate 10 and the optic axis of the quarter-wave plate 12 is set to $\pi/2$. By setting the angle between the optic axis of each of the quarter-wave plates 10 and 12 and the optic axis of the birefringent plate BP to $n\pi/2$ (n is an integer), the shape of a characteristic curve giving a wavelength characteristic of transmittance of this tunable optical filter can be changed with a change in the Faraday rotation angle given by the variable Faraday rotator 8 along the wavelength axis.

In the case that the Faraday rotation angle given by the Faraday rotator 8 is $\beta$, the phase difference between two orthogonal components of polarized light given by the variable phase shifter 6 becomes $2\beta$. The principle of this is apparent from the contents disclosed in Japanese Patent Laid-open Publication No. 6-130339 and from the known art, so the description thereof will be omitted herein.

Figure 23:
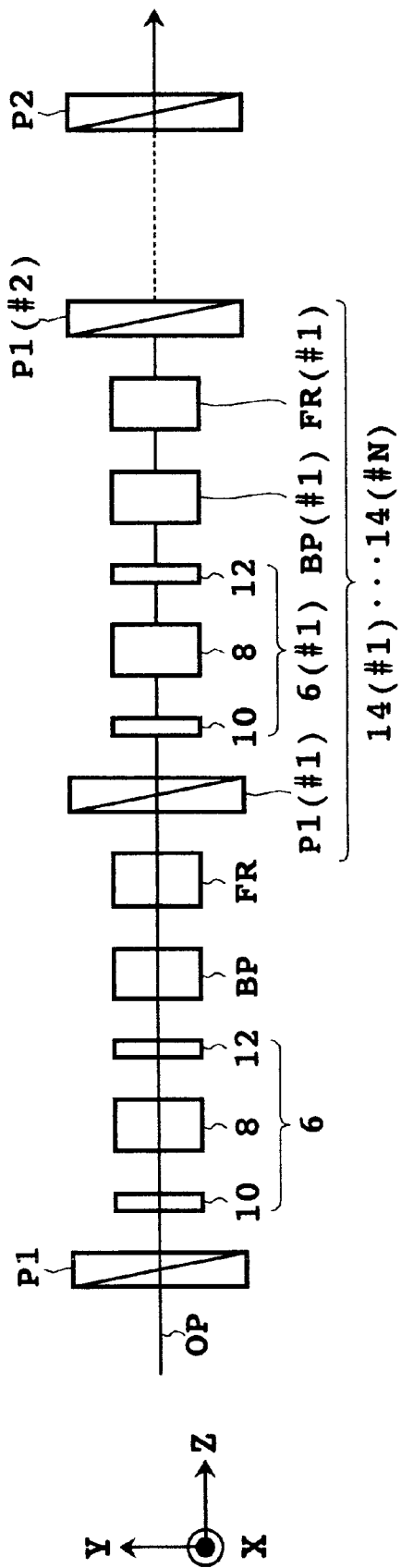
FIG. 23 is a view showing a ninth preferred embodiment of the tunable optical filter according to the present invention.

FIG. 23 shows a ninth preferred embodiment of the tunable optical filter according to the present invention. In contrast with the eighth preferred embodiment shown in FIG. 22, the ninth preferred embodiment is characterized in that at least one filter unit is additionally provided between the first polarizer P1 and the second polarizer P2. More specifically, N set (N is an integer greater than 1) of filter units 14 (#1 to #N) are provided. Of these filter units 14 (#1 to #N), the i-th (i is an integer satisfying $1 \leq i \leq N$) filter unit 14 (#i) includes a polarizer P1 (#i), a variable phase shifter 6 (#i), a birefringent plate BP (#i), and a Faraday rotator FR (#i) corresponding to the first polarizer P1, the variable phase shifter 6, the birefringent plate BP, and the variable Faraday rotator FR, respectively.

The wavelength characteristic of transmittance of this tunable optical filter as a whole is given as the sum of the wavelength characteristic of transmittance of the tunable optical filter shown in FIG. 22 and the wavelength characteristic of transmittance of each filter unit 14 (#1 to #N). Accordingly, the wavelength characteristic of transmittance can be easily arbitrarily set.

Figure 24A:
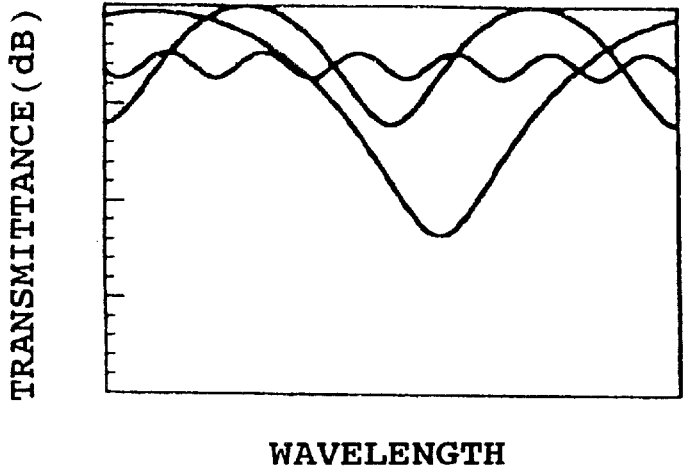
FIGS. 24A and 24B are graphs showing an example of the wavelength characteristic of transmittance obtained by the tunable optical filter shown in FIG. 23.
Figure 24B:
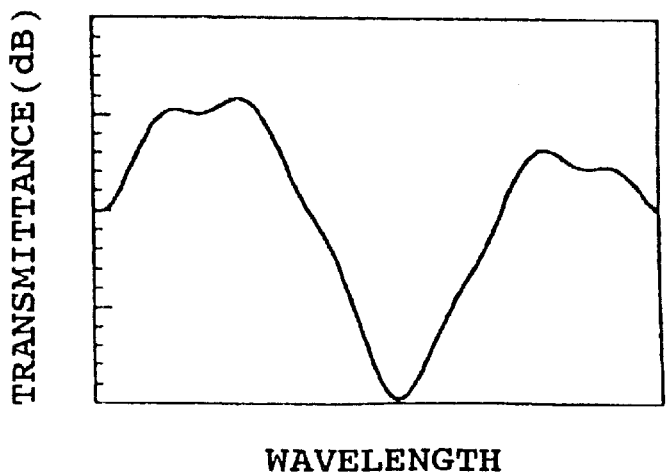

For example, in the case that three characteristic curves each giving a wavelength characteristic of transmittance are obtained in the tunable optical filter of FIG. 23 as shown in FIG. 24A, the total wavelength characteristic of transmittance is given as the sum of the three characteristic curves, so that a desired wavelength characteristic of transmittance can be obtained as shown in FIG. 24B.

While each filter unit 14 (#i) having the variable phase shifter 6 (#i) for changing a characteristic curve along the wavelength axis and the birefringent plate BP (#i) and the Faraday rotator FR (#i) for changing a characteristic curve along the transmittance axis are utilized in this preferred embodiment, either the variable phase shifter 6 (#i) or the birefringent plate BP (#i) and the Faraday rotator FR (#i) may be omitted as required.

Some specific embodiments of the Faraday rotator for giving a variable Faraday rotation angle will now be described.

In general, when linearly polarized light, for example, passes through a magneto-optic crystal in the condition where a certain magnetic field is applied to the magneto-optic crystal, i.e., in the condition where the magneto-optic crystal is placed in a certain magnetic field, a polarization direction of the linearly polarized light (defined as a projection of a plane containing an electric field vector of the linearly polarized light onto a plane perpendicular to a propagation direction of the linearly polarized light) is rotated always in a fixed direction irrespective of the propagation direction. This phenomenon is called Faraday rotation, and the magnitude of an angle of rotation of the polarization direction (Faraday rotation angle) depends on a direction and strength of magnetization of the magneto-optic crystal generated by the applied magnetic field. More specifically, the Faraday rotation angle is determined by a size of a component of the strength of magnetization of the magneto-optic crystal in the light propagation direction. Accordingly, by configuring a Faraday rotator with a magneto-optic crystal and means for applying a magnetic field to the magneto-optic crystal in the same direction as the light propagation direction, it appears that the Faraday rotation angle can be effectively adjusted by adjusting the applied magnetic field.

However, it should be considered herein that when the magnitude of the applied magnetic field is relatively small, the strength of magnetization of the magneto-optic crystal by the applied magnetic field does not reach a saturated condition, but many magnetic domains are present in the magneto-optic crystal. The presence of such many magnetic domains deteriorate reproducibility of the Faraday rotation angle, or makes it difficult to continuously vary the Faraday rotation angle even though good reproducibility is ensured. Furthermore, when many magnetic domains are present in the magneto-optic crystal, there occurs attenuation due to light scattering at an interface between any adjacent magnetic domains, causing a disadvantage in practical use.

In a preferred embodiment of the present invention intended to solve this problem, the variable Faraday rotator includes a magneto-optic crystal located on an optical path, magnetic field applying means for applying first and second magnetic fields having different directions to the magneto-optic crystal so that the strength of a synthetic magnetic field of the first and second magnetic fields becomes larger than a predetermined value (e.g., a value corresponding to the strength of a magnetic field required to saturate the strength of magnetization of the magneto-optic crystal), and magnetic field adjusting means for changing at least one of the first and second magnetic fields.

The condition where the strength of magnetization of the magneto-optic crystal has been saturated can be understood as a condition where the magnetic domains in the magneto-optic crystal has become a single magnetic domain.

Preferably, the first and second magnetic fields are applied in orthogonal directions in a plane containing a propagation direction of light passing through the magneto-optic crystal.

Figure 25:
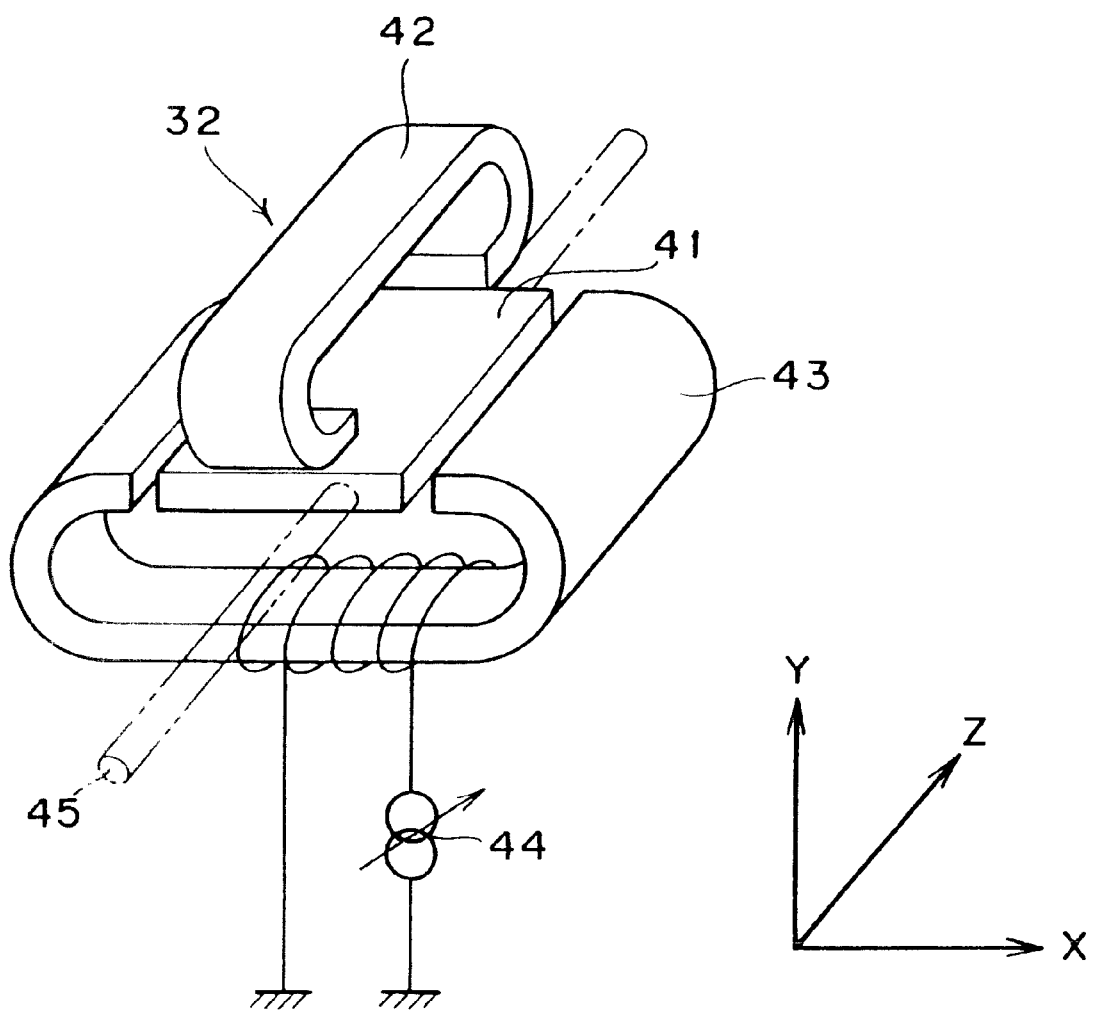
FIG. 25 is a view showing a Faraday rotator applicable to the present invention.

FIG. 25 shows a variable Faraday rotator 32 applicable to the present invention. The variable Faraday rotator 32 is usable as the variable Faraday rotator FR or the variable Faraday rotator 8. The Faraday rotator 32 includes a magneto-optic crystal 41, a permanent magnet 42 and an electromagnet 43 for applying magnetic fields in orthogonal directions to the magneto-optic crystal 41, and a variable current source 44 for giving a drive current to the electromagnet 43.

By using a thin slice of YIG (Yttrium-Iron-Garnet) or an epitaxially grown crystal of $(GdBi)_3(FeAlGa)_5O_{12}$, as the magneto-optic crystal 41, for example, the drive current can be reduced.

The thickness direction of the magneto-optic crystal 41 is parallel to the Y axis, for example. In this case, the directions of the magnetic fields applied to the magneto-optic crystal 41 by the permanent magnet 42 and the electromagnet 43 are parallel to the Z axis and the X axis respectively. Reference numeral 45 denotes a light beam passing through the magneto-optic crystal 41.

Figure 26:
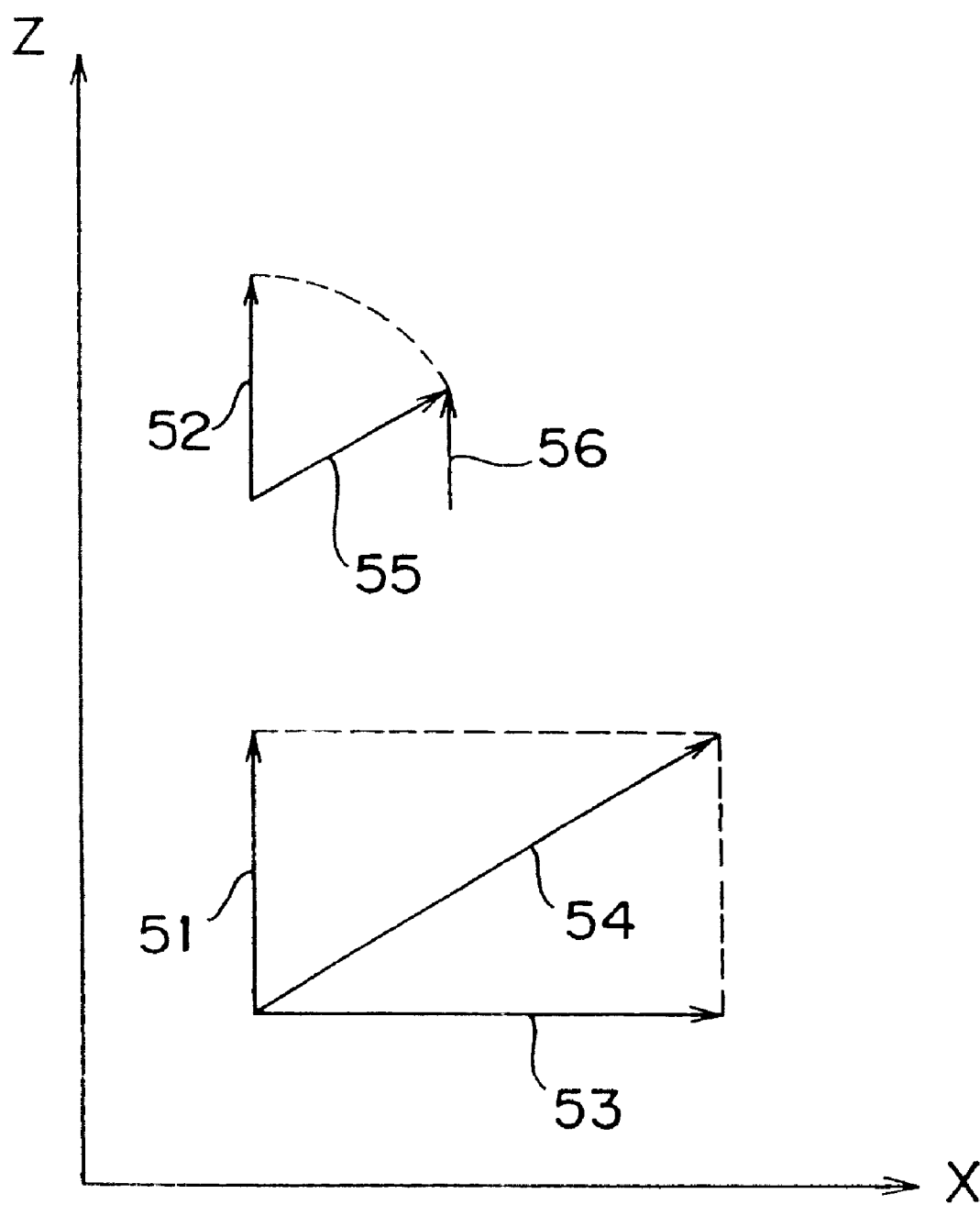
FIG. 26 is a view for illustrating magnetic fields and magnetization in FIG. 25.

FIG. 26 is a view for illustrating the direction and strength (magnitude) of the magnetic field applied to the magneto-optic crystal 41, and of the magnetization of the magneto-optic crystal 41 in the Faraday rotator 32 shown in FIG. 25.

In the case that a magnetic field vector 51 is applied to the magneto-optic crystal 41 by the permanent magnet 42 only, a magnetization vector in the magneto-optic crystal 41 is parallel to the Z axis as shown by reference numeral 52. In this case, the strength of the applied magnetic field (the length of the magnetic field vector 51) is set so that the strength of the magnetization of the magneto-optic crystal 41 (the length of the magnetization vector 52) is saturated. It is assumed that a required maximum Faraday rotation angle is obtained in this condition.

When a magnetic field vector 53 is applied parallel to the X axis by the electromagnet 43, the synthetic magnetic field is given as a synthetic vector of the magnetic field vectors 51 and 53 as shown by reference numeral 54. This synthetic magnetic field 54 generates a magnetization vector 55 in the magneto-optic crystal 41. The magnetization vector 55 and the magnetic field vector 54 are parallel to each other, and the length of the magnetization vector 55 is equal to the length of the magnetization vector 52.

Although the strength of the magnetization of the magneto-optic crystal 41 is fixed, a degree of contribution of the magnetization of the magneto-optic crystal 41 to the Faraday rotation angle is not always the same, because the Faraday rotation angle depends also upon the relation between the direction of the magnetization and the light propagation direction. That is, in comparing to the condition of the magnetization vector 52 with the condition of the magnetization vector 55, a Z component 56 of the magnetization vector 55 is smaller than a Z component (the magnetization vector 52 itself) of the magnetization vector 52. Incidentally, the Faraday rotation angle corresponding to the magnetization vector 55 is smaller than that corresponding to the magnetization vector 52.

According to this preferred embodiment, the strength of the magnetization of the magneto-optic crystal 41 is always saturated over the whole variable range of the Faraday rotation angle, thereby eliminating the disadvantage caused by formation of many magnetic domains in the magneto-optic crystal 41. That is, reproducibility of the Faraday rotation angle can be improved, and the Faraday rotation angle can be continuously changed. Further, by adjusting the drive current supplied from the variable current source 44, the Faraday rotation angle can be changed continuously with good reproducibility. Accordingly, by applying the Faraday rotator 32 to the present invention, it is possible to provide a tunable optical filter which can be operated at high speeds and has high reliability.

Accordingly, by applying such a variable Faraday rotator to the present invention, it is possible to provide a tunable optical filter whose wavelength characteristic of transmittance is well reproducible and continuously variable.

Figure 27:
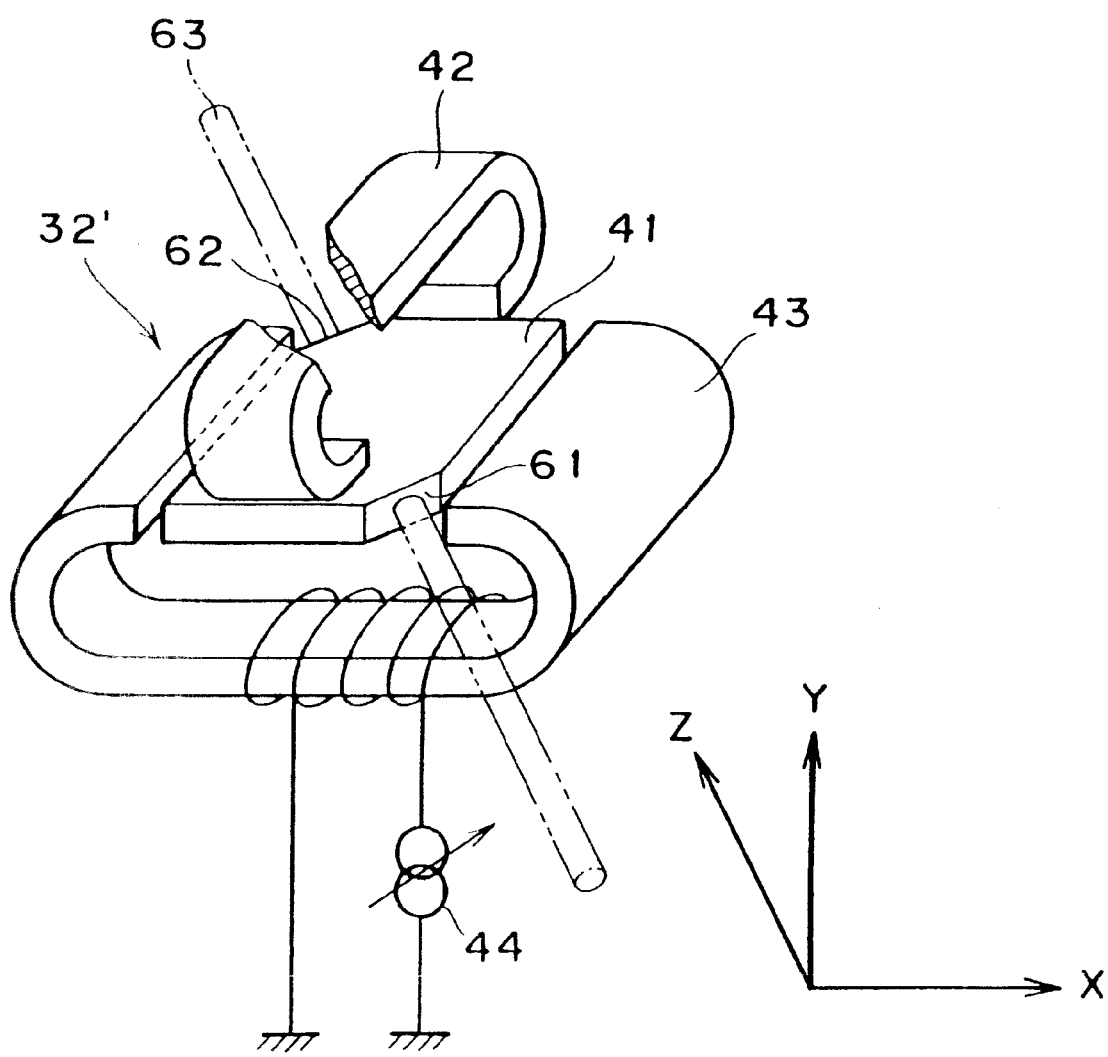
FIG. 27 is a view showing another Faraday rotator applicable to the present invention.

FIG. 27 shows another Faraday rotator 32' applicable to the present invention. The Faraday rotator 32' is different from the Faraday rotator 32 shown in FIG. 25 in the point that parallel plane surfaces 61 and 62 are formed at opposite edges of a rectangular magneto-optic crystal 41 and that a light beam 63 is passed through the plane surfaces 61 and 62. Accordingly, both the direction of a magnetic field by the permanent magnet 42 and the direction of a magnetic field by the electromagnet 43 are inclined about 45° to a light propagation direction (parallel to the Z axis).

Figure 28:
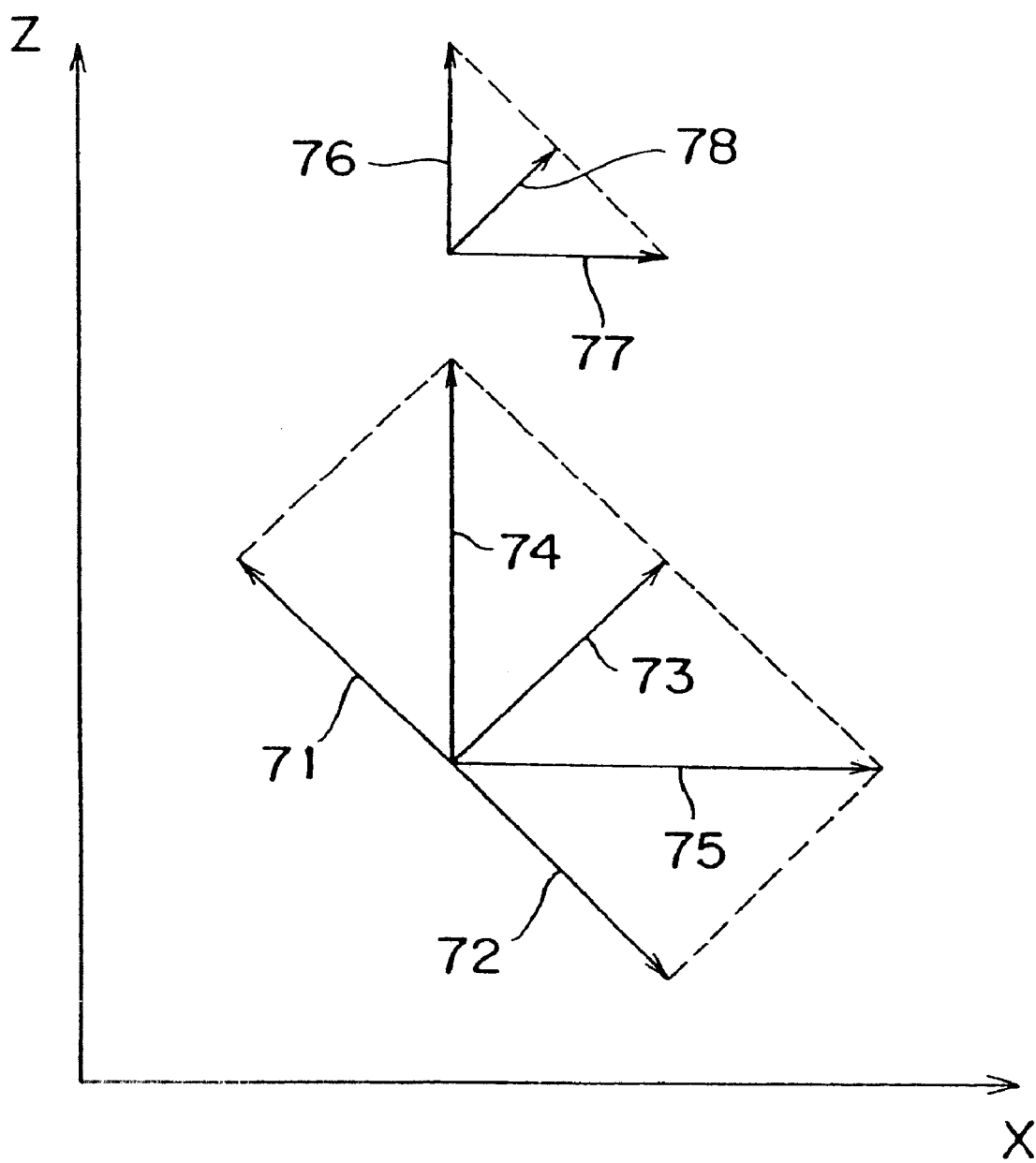
FIG. 28 is a view for illustrating magnetic fields and magnetization in FIG. 27.

FIG. 28 is a view for illustrating the direction and strength of the magnetic field applied to the magneto-optic crystal 41 and of the magnetization of the magneto-optic crystal 41 in the Faraday rotator 32' shown in FIG. 27. The magnetic field applied by the electromagnet 43 is adjustable in strength and direction in the range between a condition shown by reference numeral 71 and a condition shown by reference numeral 72. Reference numeral 73 denotes a magnetic field applied by the permanent magnet 42. In this case, the synthetic magnetic field changes in strength and direction.in the range between a condition shown by reference numeral 74 and a condition shown by reference numeral 75. In association therewith, the magnetization of the magneto-optic crystal 41 changes in strength and direction in the range between a condition shown by reference numeral 76 and a condition shown by reference numeral 77. By using the Faraday rotator 32', the variable range of the Faraday rotation angle can be increased without much increasing the variable range for the drive current of the electromagnet 43.

The applied magnetic field by the permanent magnet 42 is set so that the strength of the magnetization of the magneto-optic crystal 41 is sufficiently saturated in a condition shown by reference numeral 78 where the strength of the magnetization is minimized (the applied magnetic field by the electromagnet 43 is zero).

Figure 29:
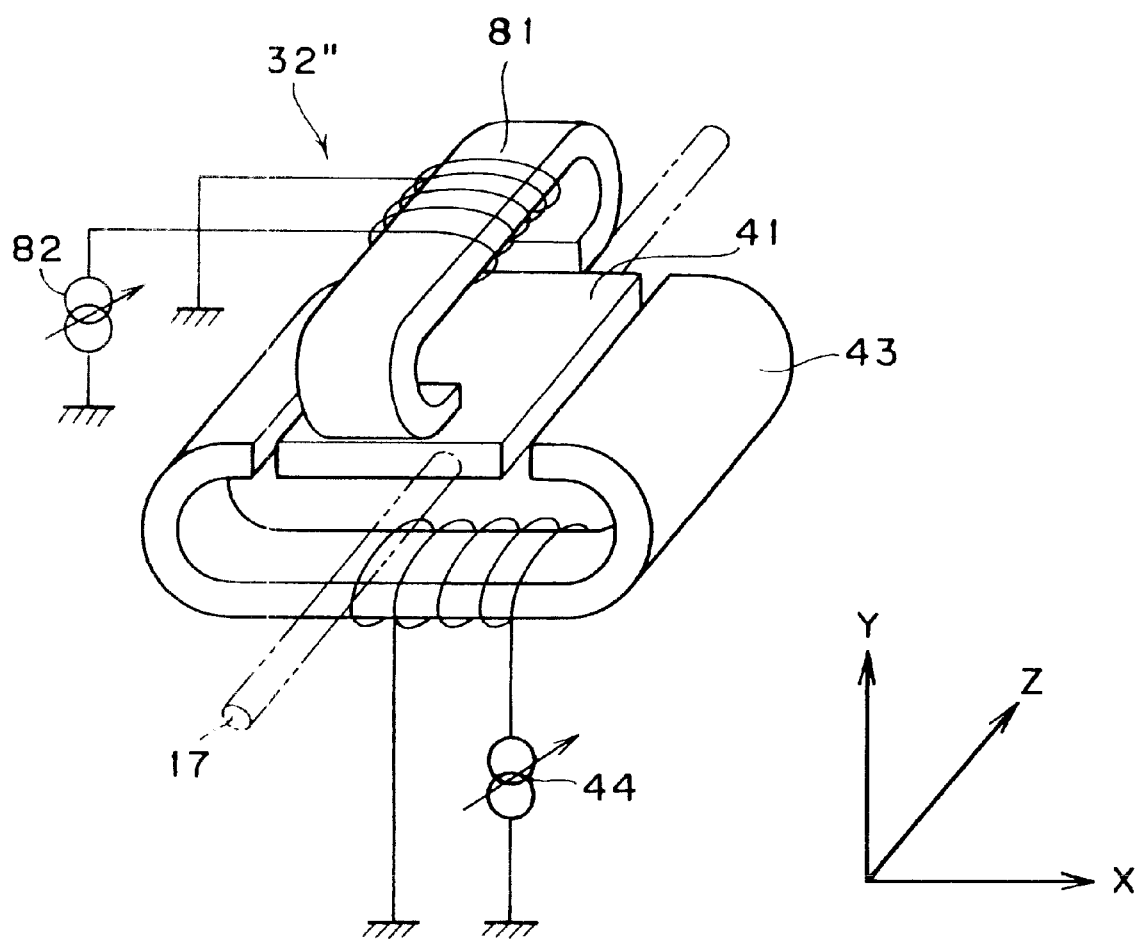
FIG. 29 is a view showing still another Faraday rotator applicable to the present invention.

FIG. 29 shows still another variable Faraday rotator 32" applicable to the present invention. The Faraday rotator 32" is different from the Faraday rotator 32 shown in FIG. 25 in the point that an electromagnet 81 is provided in place of the permanent magnet 42 shown in FIG. 25 and that a variable current source 82 is additionally provided to apply a drive current to the electromagnet 81.

Figure 30:
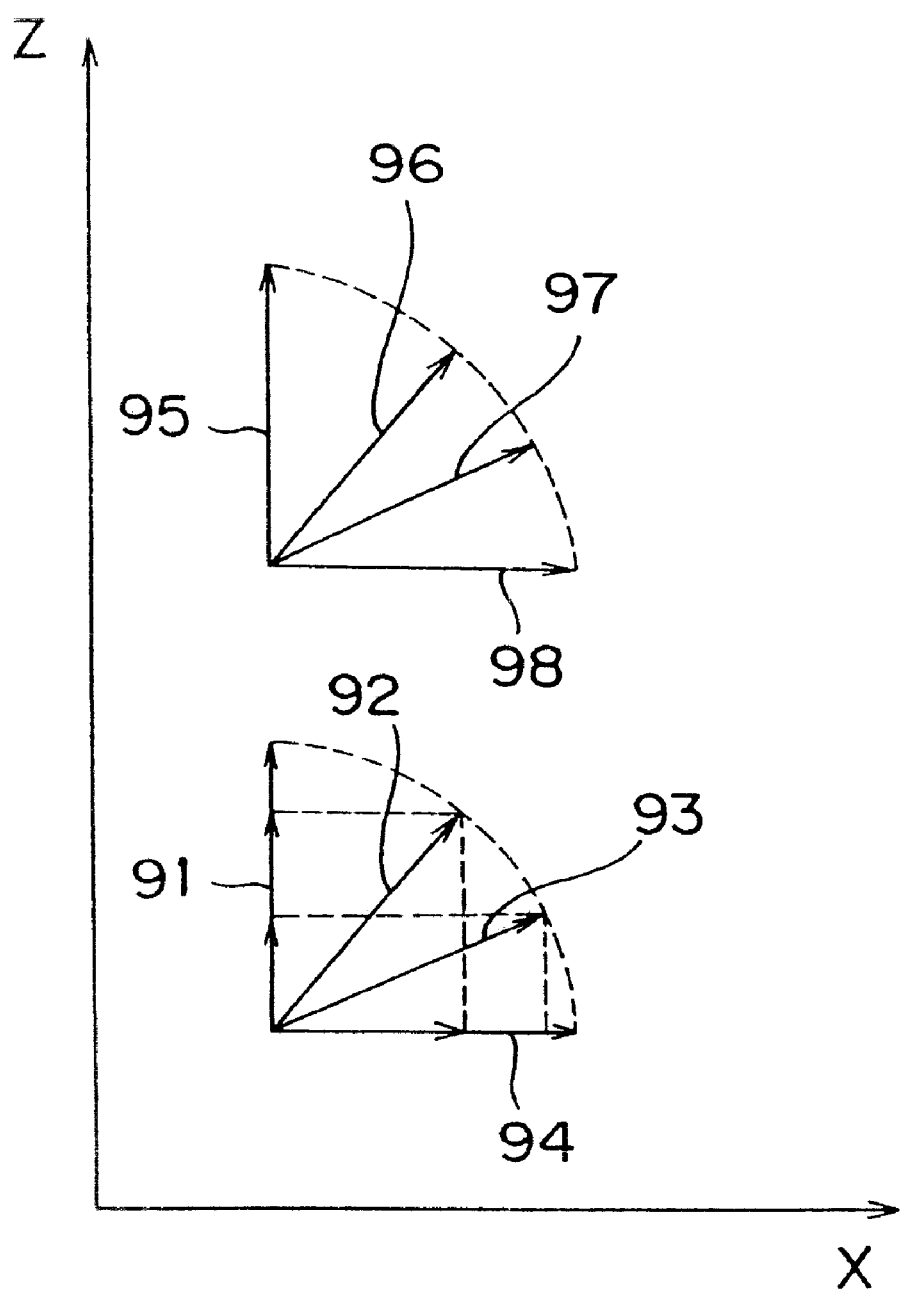
FIG. 30 is a view for illustrating magnetic fields and magnetization in FIG. 29.

FIG. 30 is a view for illustrating the direction and strength of the magnetic field applied to the magneto-optic crystal 41 and of the magnetization of the magneto-optic crystal 41 in the Faraday rotator 32" shown in FIG. 29. According to the preferred embodiment shown in FIG. 29, the synthetic magnetic field can be changed continuously as maintaining saturation magnetization as shown by reference numerals 91 to 94 by adjusting the applied magnetic fields by the electromagnets 43 and 81. In association therewith, the magnetization of the magneto-optic crystal 41 changes continuously as shown by reference numerals 95 to 98. According to the preferred embodiment shown in FIG. 30, the variable range of the Faraday rotation angle can be easily increased without using a complex-shaped magneto-optic crystal as shown in FIG. 27.

In the case of using the Faraday rotator 32", the sense of a Z component of the magnetization of the magneto-optic crystal 41 can be changed by changing the polarity of the variable current source 44 or 82. Accordingly, the direction of Faraday rotation can be changed as required For example, the Faraday rotation angle can be changed in the range of ±45 n° (n is a positive integer) with respect to 0°. Accordingly, by applying the Faraday rotator 32" to the present invention and setting the angle δ to δ=φ or δ=θ as mentioned previously, for example, the transmittance can be maintained constant irrespective of wavelength when the Faraday rotation angle is 0°. For example, when the Faraday rotator 32" is incorporated into a system and control becomes off to shut off the variable current sources 44 and 82, the Faraday rotation angle becomes 0°. Accordingly, the transmittance becomes constant irrespective of wavelength, thereby facilitating restart of the system.

Figure 31:
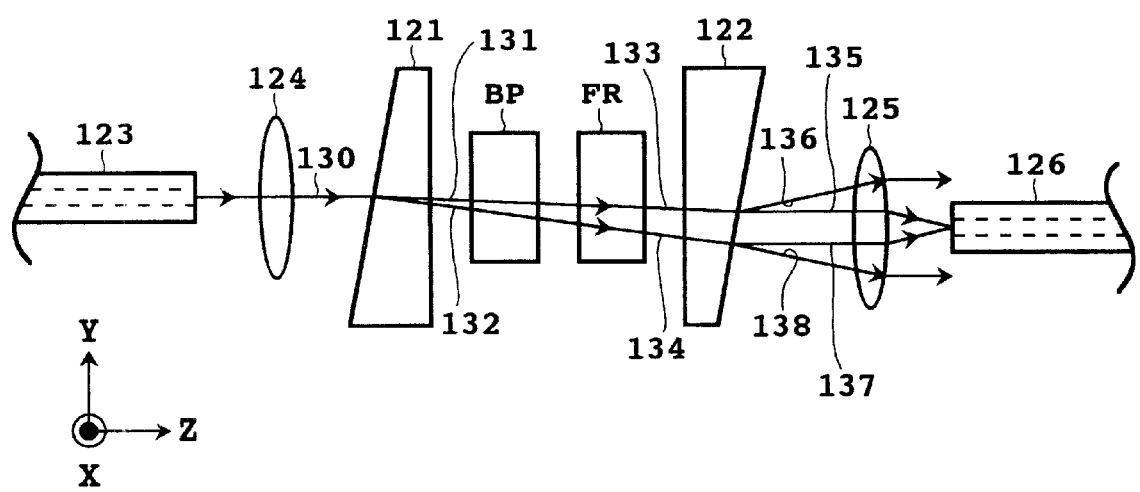
FIG. 31 is a view showing a tenth preferred embodiment of the tunable optical filter according to the present invention.

FIG. 31 shows a tenth preferred embodiment of the tunable optical filter according to the present invention. In this preferred embodiment, wedge plates 121 and 122 each formed of a birefringent material are used as the first polarizer P1 and the second polarizer P2 respectively. In association therewith, this preferred embodiment further includes an optical fiber 123, a lens 124 for changing a beam parameter of light emerging from the optical fiber 123 (e.g., collimating the emerging light) to supply the light beam to the wedge plate 121, a lens 125 for converging a light beam from the wedge plate 122, and an optical fiber 126 to which the light beam converged by the lens 125 is coupled under given conditions.

The wedge plates 121 and 122 are arranged so that a top portion and a bottom portion of the wedge plate 121 are opposed to a bottom portion and a top portion of the wedge plate 122 respectively, and corresponding surfaces of the wedge plates 121 and 122 are parallel to each other. That is, the wedge plates 121 and 122 have the same shape.

For example, the optic axis of the wedge plate 121 is parallel to the Y axis, and the optic axis of the wedge plate 122 is parallel to the Y axis.

The transmittance axis of each of the wedge plates 121 and 122 as polarizers is defined as a polarization direction of an extraordinary ray whose polarization plane is parallel to the optic axis, or a polarization direction of an ordinary ray whose polarization plane is perpendicular to the optic axis.

Light emerging from an excitation end of the optical fiber 123 is collimated by the lens 124 to become a parallel light beam. This beam is denoted by reference numeral 130 with its beam thickness neglected. The beam 130 is separated into a beam 131 corresponding to the ordinary ray and a beam 132 corresponding to the extraordinary ray in the wedge plate 121.

The beams 131 and 132 are transmitted through the birefringent plate BP and the variable Faraday rotator FR in this order to become beams 133 and 134 respectively. The polarization states of the beams 133 and 134 are determined by the Faraday rotation angle given by the Faraday rotator FR.

The beam 133 is separated into beams 135 and 136 respectively, corresponding to the ordinary ray and the extraordinary ray in the wedge plate 122. The beam 134 is separated into beams 137 and 138 respectively, corresponding to the extraordinary ray and the ordinary ray in the wedge plate 122.

In considering the history of refractions in the past of the beams 135 to 138 and the shape and arrangement of the wedge plates 121 and 122, the beams 135 and 137 are parallel to each other and the beams 136 and 138 are not parallel to each other. Accordingly, only the beams 135 and 137 can be focused through the lens 125 to be coupled to an excitation end of the optical fiber 126.

The ratio of the total power of the beams 135 and 137 and the total power of the beams 136 and 138 depends on the Faraday rotation angle given by the Faraday rotator FR. For example, in the case that the beams 133 and 134 are linearly polarized light having the same polarization planes as those of the beams 131 and 132 respectively, the beams 133 and 134 are entirely converted into the beams 135 and 137 respectively. In the case that the beams 133 and 134 are linearly polarized light having polarization planes orthogonal to the polarization planes of the beams 131 and 132 respectively, the beams 133 and 134 are entirely converted into the beams 136 and 138 respectively.

When the Faraday rotation angle given by the Faraday rotator FR is constant, the total power of the beams 135 and 137 is not dependent upon the polarization state of the beam 130. As apparent from the previous description, the total power of the beams 135 and 137 depends on their wavelengths.

According to this preferred embodiment, the transmittance of the tunable optical filter can therefore be made independent of the polarization state of input light. That is, it is possible to provide a polarization-independent tunable optical filter.

Figure 32:
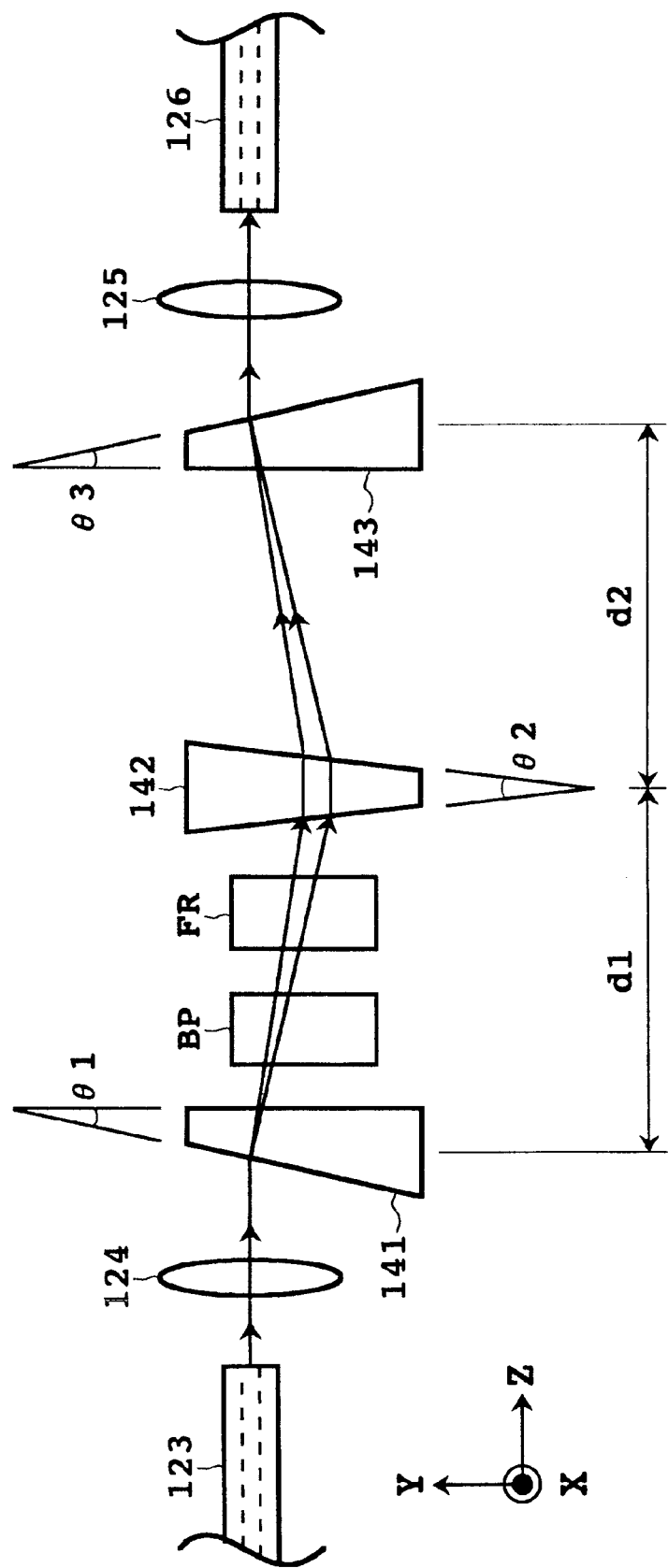
FIG. 32 is a view showing an eleventh preferred embodiment of the tunable optical filter according to the present invention.

FIG. 32 shows an eleventh preferred embodiment of the tunable optical filter according to the present invention. In this preferred embodiment, a wedge plate 141 formed of a birefringent material is used as the first polarizer P1, and two wedge plates 142 and 143 each formed of a birefringent material are used as the second polarizer P2. A top portion and a bottom portion of the wedge plate 141 are opposed to a bottom portion and a top portion of the wedge plate 142 respectively. A top portion and a bottom portion of the wedge plate 143 are opposed to the bottom portion and the top portion of the wedge plate 142 respectively.

By letting θ1, θ2, and θ3 denote the wedge angles of the wedge plates 141, 142, and 143; d1 denote the distance between the wedge plates 141 and 142, and d2 denote the distance between the wedge plates 142 and 143, each wedge plate is formed and arranged in order to satisfy the following two equation.

$$\theta2=\theta1+\theta3, d1\sin \theta1=d2\sin \theta3$$

The optic axis of the wedge plate 141 is parallel to the Y axis, and the optic axes of the wedge plates 142 and 143 are parallel to each other. The optic axes of the wedge plates 142 and 143 are parallel to the Y axis, for example.

In the preferred embodiment shown in FIG. 31, the distance between the wedge plates 121 and 122 is necessarily relatively large, because the birefringent plate BP and the Faraday rotator FR are provided between the wedge plates 121 and 122. Accordingly, the distance between the beams 135 and 137 becomes relatively large, so that the beams 135 and 137 are readily affected by the aberration of the lens 125 such as spherical aberration.

According to the preferred embodiment shown in FIG. 32, a beam from the lens 124 is separated by the wedge plate 141 and next being combined by the wedge plates 142 and 143. At this time, the optical paths of an ordinary ray component and an extraordinary ray component output from the wedge plate 143 are made substantially coincident with each other. Consequently, these components can be efficiently input into the optical fiber 126 by the lens 125 with almost no influence of its aberration.

Figure 33:
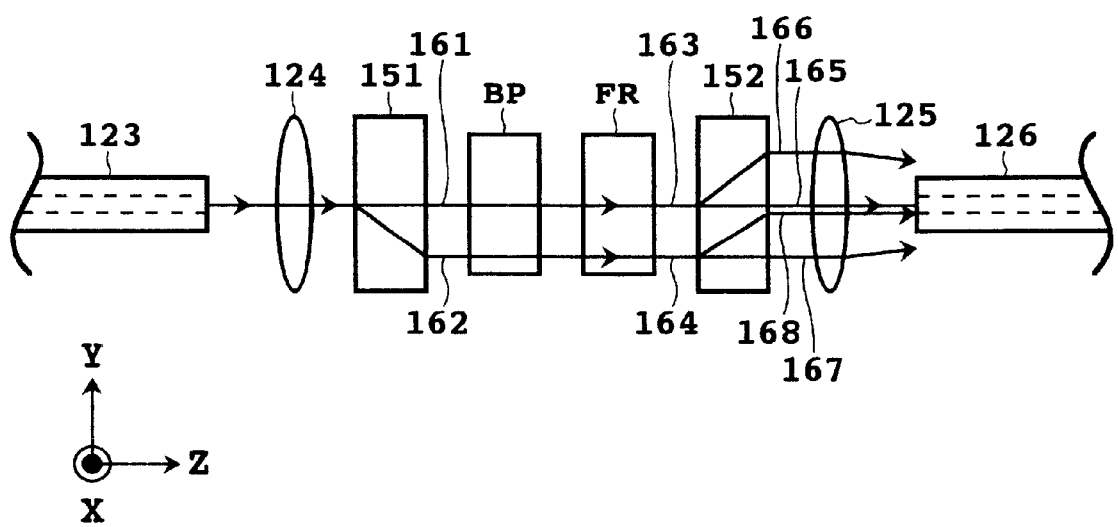
FIG. 33 is a view showing a twelfth preferred embodiment of the tunable optical filter according to the present invention.

FIG. 33 shows a twelfth preferred embodiment of the tunable optical filter according to the present invention. In this preferred embodiment, two parallel-plane plates 151 and 152 each formed of a birefringent material are used as the first polarizer P1 and the second polarizer P2 respectively. The parallel-plane plates 151 and 152 have the same thickness. The optic axes of the parallel-plane plates 151 and 152 are set so that they are orthogonal to each other and each optic axis is inclined 45° to the Z axis.

The transmission axis of each of the parallel-plane plates 151 and 152 as polarizers is defined as a polarization direction of an extraordinary ray whose polarization plane is parallel to the optic axis or a polarization direction of an ordinary ray whose polarization plane is perpendicular to the optic axis.

Light emerging from the excitation end of the optical fiber 123 is changed in its beam parameter by the lens 124 to become a converging beam 160, for example. The beam 160 is separated into beams 161 and 162 respectively, corresponding to the ordinary ray and the extraordinary ray in the parallel-plane plate 151. The beams 161 and 162 are parallel to each other. The beams 161 and 162 are transmitted through the birefringent plate BP and the Faraday rotator FR in this order to become beams 163 and 164 respectively. The polarization states of the beams 163 and 164 are determined according to the Faraday rotation angle given by the Faraday rotator FR. The beam 163 is separated into beams 165 and 166 respectively, corresponding to the ordinary ray and the extraordinary ray in the parallel-plane plate 152. The beam 164 is separated into beams 167 and 168 respectively, corresponding to the ordinary ray and the extraordinary ray in the parallel-plane plate 152.

The beam 165 comes into coincidence with the beam 168 because the parallel-plane plates 151 and 152 are parallel to each other and have the same thickness along the Z axis. Accordingly, only the beams 165 and 168 can be converged by the lens 125 to enter the optical fiber 126. The ratio between the total power of the beams 165 and 168 and the total power of the beams 166 and 167 depends on the Faraday rotation angle given by the Faraday rotator FR.

When the Faraday rotation angle given by the Faraday rotator FR is constant, the total power of the beams 165 and 168 is not dependent upon the polarization state of the beam 160. As apparent from the previous description, the total power of the beams 165 and 168 depends on their wavelengths.

Also according to this preferred embodiment, it is possible to provide a polarization-independent tunable optical filter.

In the case of using a parallel-plane plate formed of a birefringent material as each polarizer, various arrangements may be adopted by additionally providing a half-wave plate.

Figure 34A:
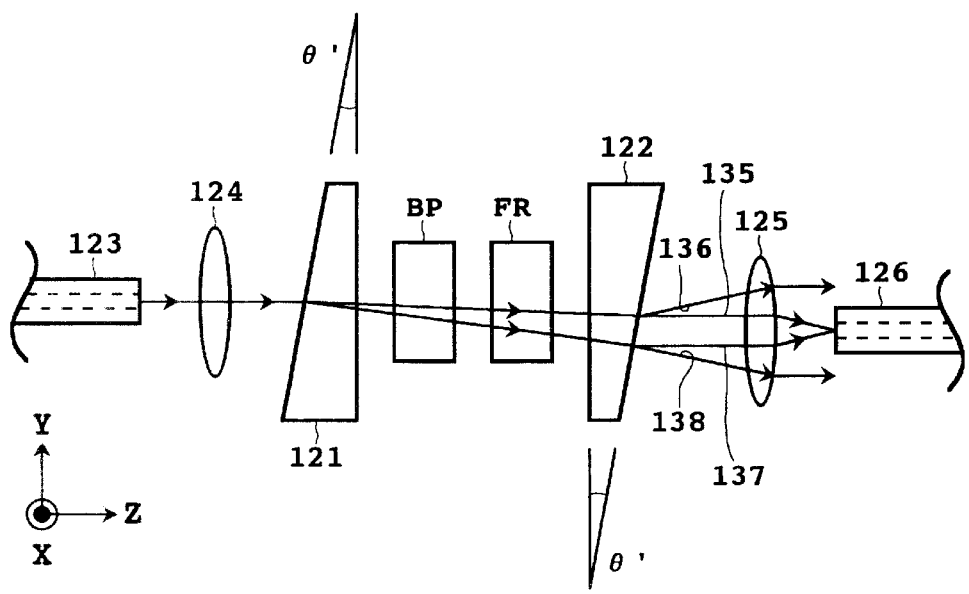
FIG. 34A is a view showing a tunable optical filter corresponding to that shown in FIG. 31.
Figure 34B:
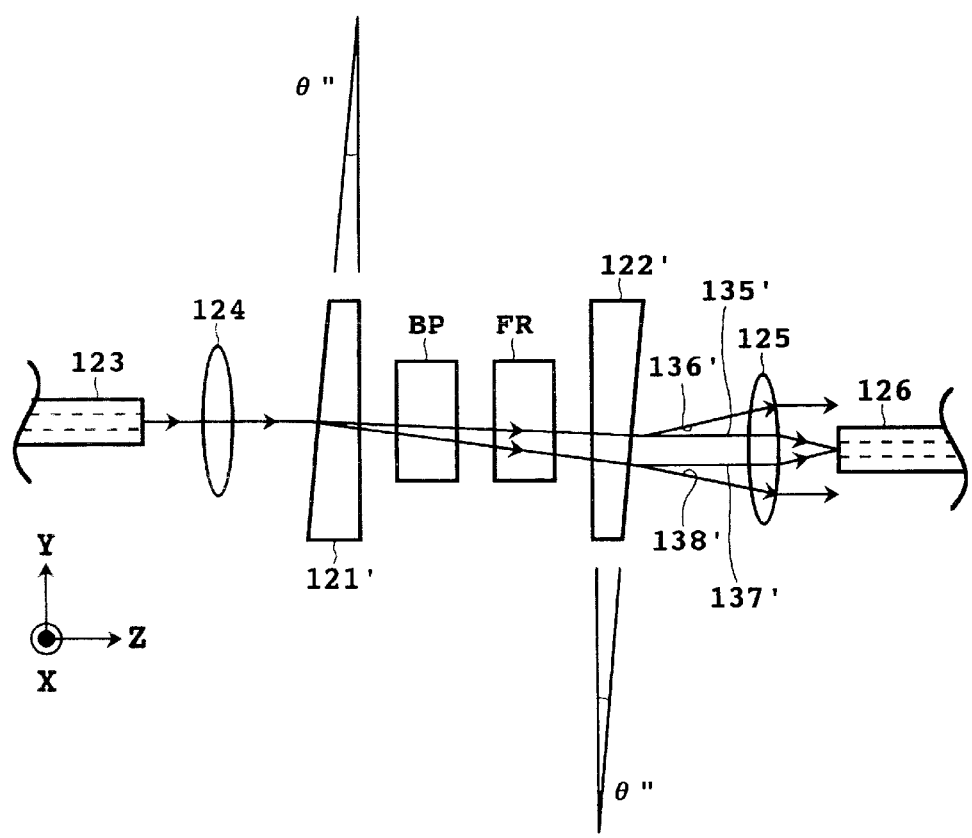
FIG. 34B is a view showing a thirteenth preferred embodiment of the tunable optical filter according to the present invention.

FIGS. 34A and 34B illustrate a thirteenth preferred embodiment of the tunable optical filter according to the present invention. FIG. 34A corresponds to the tenth preferred embodiment shown in FIG. 31, and FIG. 34B shows the thirteenth preferred embodiment.

In the configuration shown in FIG. 34A, each of the wedge plates 121 and 122 has a polarization separation angle or wedge angle $\theta'$. The beams 135 and 137 are coupled to the optical fiber 126 by the lens 125, but the beams 136 and 138 are not coupled to the optical fiber 126.

In the thirteenth preferred embodiment shown in FIG. 34B, wedge plates 121' and 122' each having a wedge angle $\theta''$ smaller than the wedge angle $\theta'$ are used. Beams 135' to 138' are output from the wedge plate 122'. The beams 135' and 137' are entirely coupled to the optical fiber 126 by the lens 125 in principle. Because the wedge angle $\theta''$ is smaller than the wedge angle $\theta'$, the beams 136' and 138' originally unexpected to be coupled to the optical fiber 126 may be partially coupled to the optical fiber 126. If such partial coupling of the beams 136' and 138' occurs, it is possible to obtain an effect similar to that obtained by using a partial polarizer as the second polarizer P2.

The condition for partially coupling the beams 136' and 138' to the optical fiber 126 is given by a $>f\sin \theta''$ where a is the core diameter of the optical fiber 126 and f is the focal length of the lens 125. By satisfying this condition, the average loss of the tunable optical filter can be reduced as in the case of using a partial polarizer as the second polarizer P2.

Having thus described various preferred embodiments of the present invention, two or more of the above preferred embodiments may be combined to carry out the present invention.

As described above, according to the present invention, it is possible to provide a tunable optical filter in which the shape of a characteristic curve giving a wavelength characteristic of transmittance changes along the transmittance axis. The other effects by the present invention become apparent from the above description.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical filter comprising:
   a filter having an optical transmittance versus wavelength characteristic curve to filter a light, the curve being changeable; and
   a controller changing the curve, the optical filter thereby being a variable optical filter, wherein, as the curve changes, the curve maintains a fixed optical transmittance at a specific wavelength.

2. An optical filter as in claim 1, wherein the filter comprises a Faraday rotator to provide the curve, and the controller controls the Faraday rotator to change the curve.

3. An optical filter comprising:

a filter having an optical transmittance versus wavelength characteristic curve to filter a light, the curve being changeable; and a controller changing the curve, the filter thereby being a variable optical filter, wherein, as the curve changes, the curve maintains a minimum optical transmittance and a maximum optical transmittance at the same wavelength.

4. An optical filter as in claim 3, wherein the filter comprises a Faraday rotator to provide the curve, and the controller controls the Faraday rotator to change the curve.

5. An optical filter comprising:

a filter having an optical transmittance versus wavelength characteristic curve to filter a light, the curve being changeable; and a controller changing the curve, the filter thereby being a variable optical filter, wherein, as the curve changes, the curve maintains a maximum optical transmittance at a first wavelength and a minimum optical transmittance at a second wavelength and maintains a fixed optical transmittance at a center wavelength between the first and second wavelengths.

6. An optical filter as in claim 5, wherein the filter comprises a Faraday rotator to provide the curve, and the controller controls the Faraday rotator to change the curve.

7. A method comprising:

filtering a light in accordance with an optical transmittance versus wavelength characteristic curve, the curve being changeable; and changing the curve, to thereby provide variable optical filtering, wherein, as the curve changes, the curve maintains a fixed amount of optical transmittance at a specific wavelength.

8. A method as in claim 7, wherein the curve is provided via a Faraday rotator, and said changing controls the Faraday rotator to change the curve.

9. A method comprising:

filtering a light in accordance with an optical transmittance versus wavelength characteristic curve, the curve being changeable; and changing the curve, to thereby provide variable optical filtering, wherein, as the curve changes, the curve maintains a minimum optical transmittance and a maximum optical transmittance at the same wavelength.

10. A method as in claim 9 wherein the curve is provided via a Faraday rotator, and said changing controls the Faraday rotator to change the curve.

11. A method comprising:

filtering a light in accordance with an optical transmittance versus wavelength characteristic curve, the curve being changeable; and changing the curve, to thereby provide variable optical filtering, wherein, as the curve changes, the curve maintains a maximum optical transmittance at a first wavelength and a minimum optical transmittance at a second wavelength and maintains a fixed optical transmittance at a center wavelength between the first and second wavelengths.

12. A method as in claim 11, wherein the curve is provided via a Faraday rotator, and said changing controls the Faraday rotator to change the curve.

13. An optical filter comprising:

a filter having an optical transmittance versus wavelength characteristic curve to filter a light, the curve being changeable; and a controller changing the curve, the optical filter thereby being a variable optical filter, wherein, as the curve changes, the curve maintains a fixed optical transmittance at least two specific wavelengths.

14. An optical filter as in claim 13, wherein the filter comprises a Faraday rotator to provide the curve, and the controller controls the Faraday rotator to change the curve.

15. A method comprising:

filtering a light in accordance with an optical transmittance versus wavelength characteristic curve, the curve being changeable; and changing the curve, to thereby provide variable optical filtering, wherein, as the curve changes, the curve maintains a fixed amount of optical transmittance at least two specific wavelengths.

16. A method as in claim 15, wherein the curve is provided via a Faraday rotator, and said changing controls the Faraday rotator to change the curve.

17. An apparatus comprising:

an optical filter having a changeable optical transmittance versus wavelength characteristic curve to variably filter a light, the curve maintaining a fixed optical transmittance at a specific wavelength as the curve changes.

18. An apparatus as in claim 17, wherein the optical filter comprises a Faraday rotator to provide the curve, the Faraday rotator being controlled to change the curve.

19. An apparatus comprising:

an optical filter having a changeable optical transmittance versus wavelength characteristic curve to variably filter a light, the curve maintaining a minimum optical transmittance and a maximum optical transmittance at the same wavelength as the curve is changed.

20. An apparatus as in claim 19, wherein the optical filter comprises a Faraday rotator to provide the curve, the Faraday rotator being controlled to change the curve.

21. An apparatus comprising:

an optical filter having a changeable optical transmittance versus wavelength characteristic curve to variably filter a light, wherein, as the curve changes, the curve maintains a maximum optical transmittance at a first wavelength and a minimum optical transmittance at a second wavelength and maintains a fixed optical transmittance at a center wavelength between the first and second wavelengths.

22. An apparatus as in claim 21, wherein the optical filter comprises a Faraday rotator to provide the curve, the Faraday rotator being controlled to change the curve.

23. An apparatus comprising:

an optical filter having a changeable optical transmittance versus wavelength characteristic curve to variably filter a light, the curve maintaining a fixed optical transmittance at least two specific wavelengths as the curve changes.

24. An apparatus as in claim 23, wherein the optical filter comprises a Faraday rotator to provide the curve, the Faraday rotator being controlled to change the curve.

25. An apparatus comprising:

means for filtering a light in accordance with an optical transmittance versus wavelength characteristic curve, the curve being changeable; and means for changing the curve, to thereby provide variable optical filtering, wherein, as the curve changes, the curve maintains a fixed amount of optical transmittance at a specific wavelength.

26. An apparatus comprising:

means for filtering a light in accordance with an optical transmittance versus wavelength characteristic curve, the curve being changeable; and means for changing the curve, to thereby provide variable optical filtering, wherein, as the curve changes, the curve maintains a minimum optical transmittance and a maximum optical transmittance at the same wavelength.

27. An apparatus comprising:

means for filtering a light in accordance with an optical transmittance versus wavelength characteristic curve, the curve being changeable; and means for changing the curve, to thereby provide variable optical filtering, wherein, as the curve changes, the curve maintains a maximum optical transmittance at a first wavelength and a minimum optical transmittance at a second wavelength and maintains a fixed optical transmittance at a center wavelength between the first and second wavelengths.

28. An apparatus comprising:

means for filtering a light in accordance with an optical transmittance versus wavelength characteristic curve, the curve being changeable; and means for changing the curve, to thereby provide variable optical filtering, wherein, as the curve changes, the curve maintains a fixed amount of optical transmittance at least two specific wavelengths.

* * * * *